Patented June 15, 1954

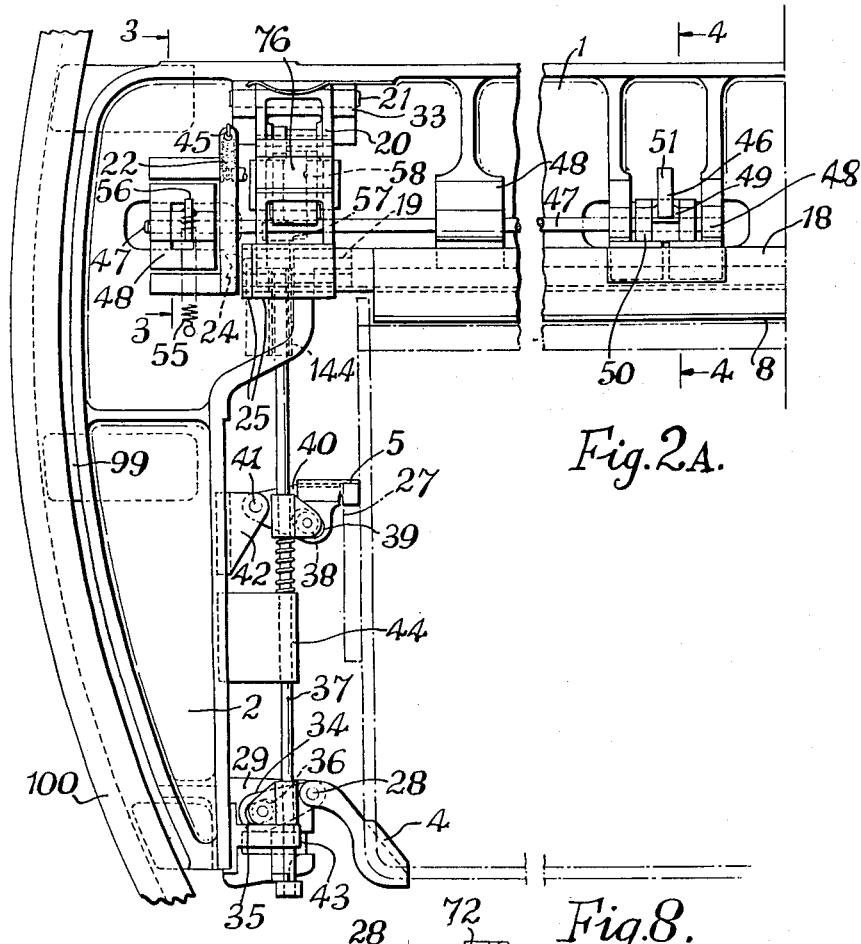
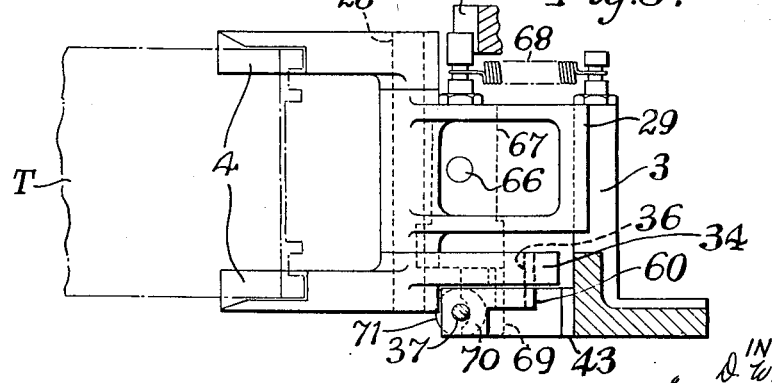

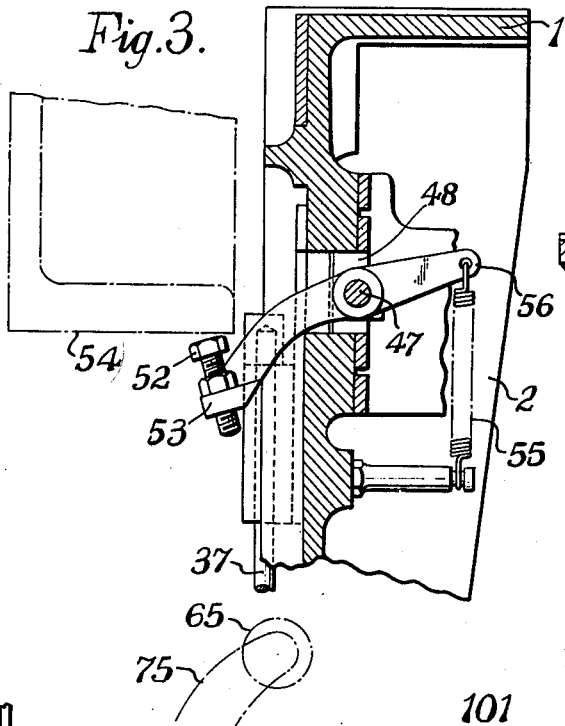
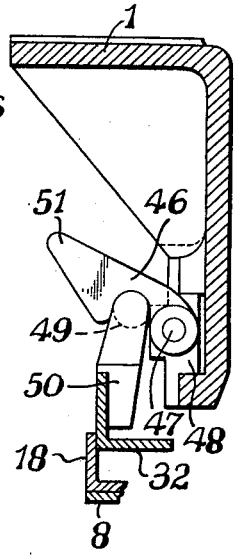
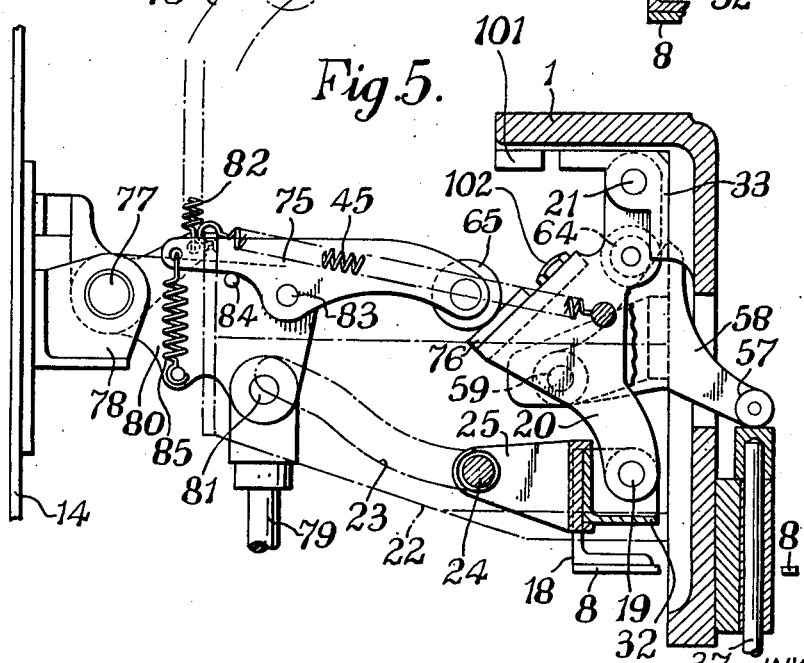

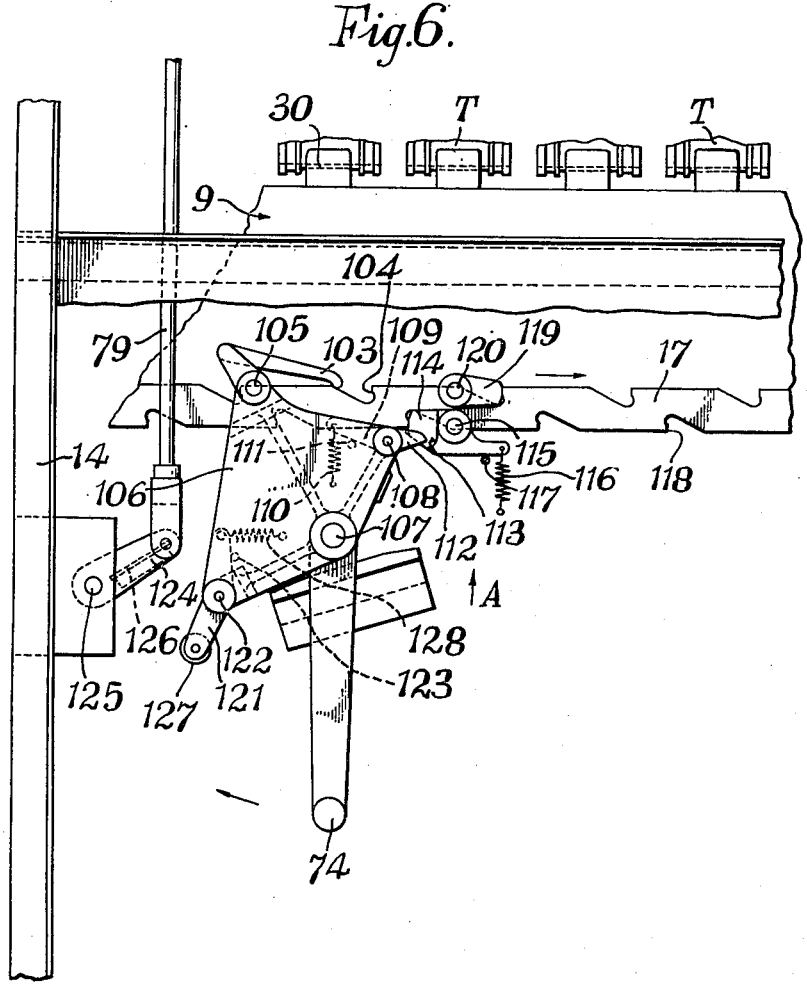
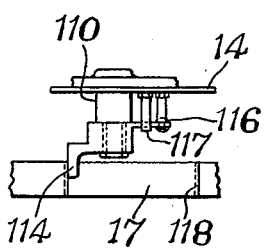

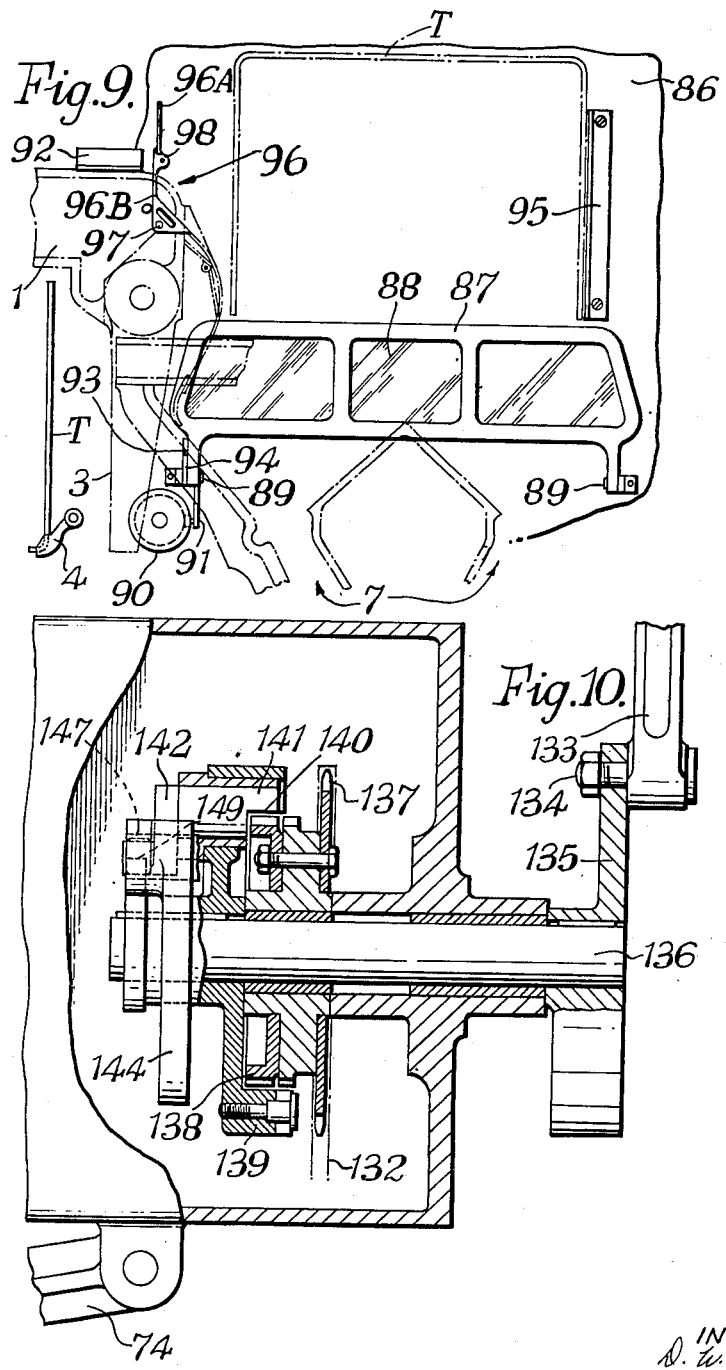

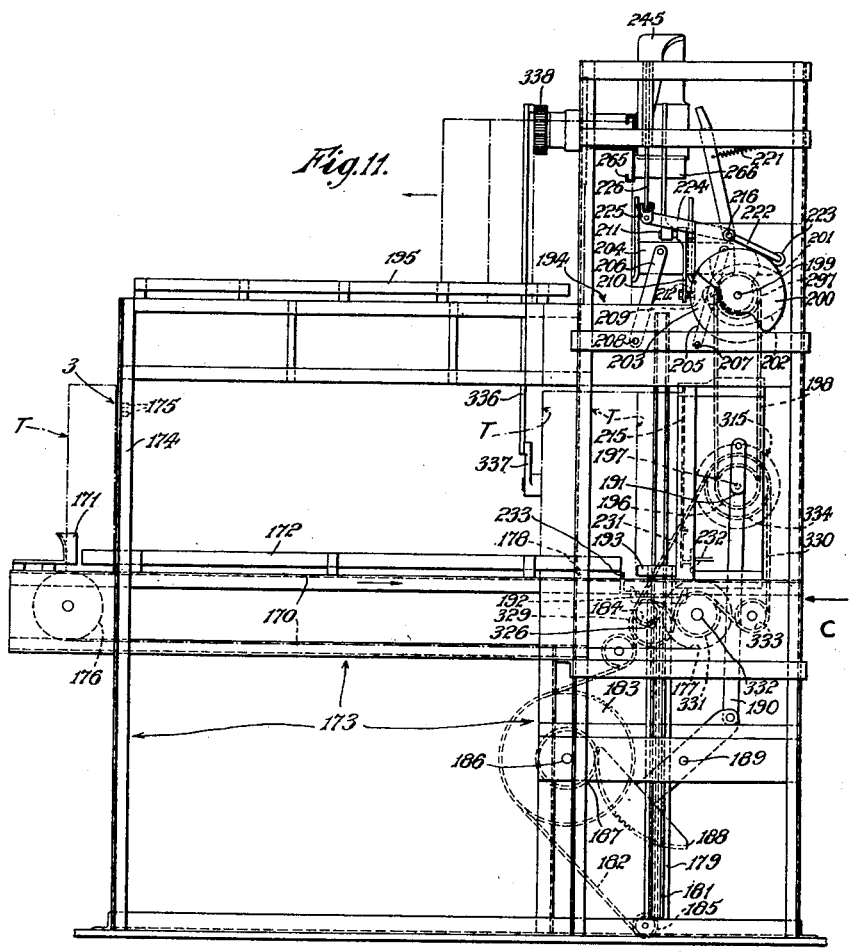

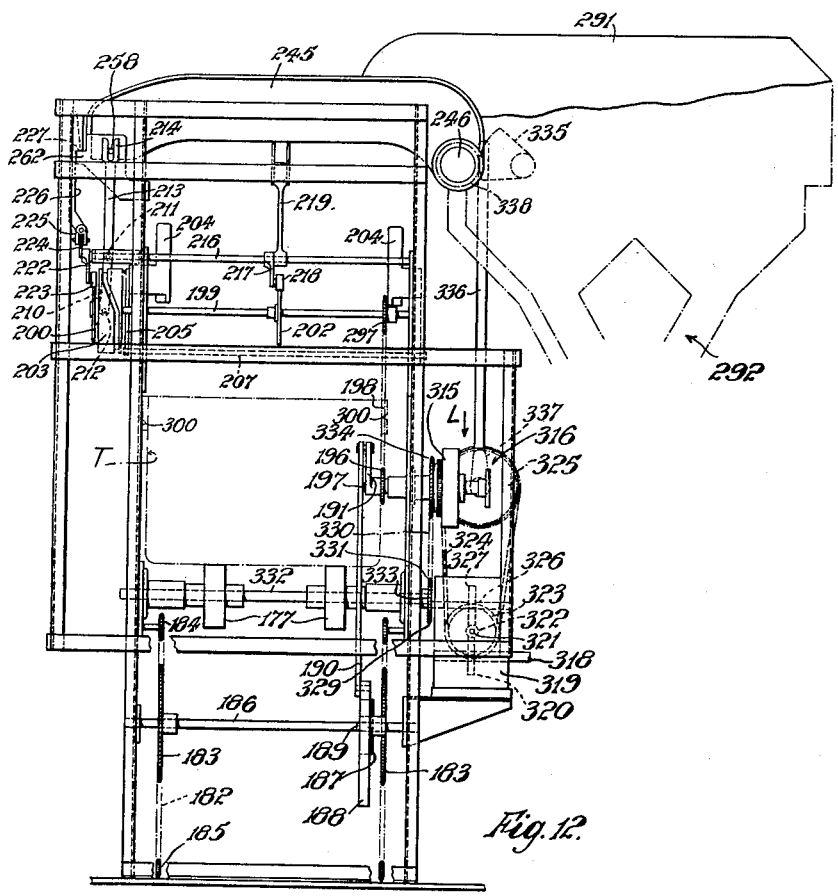

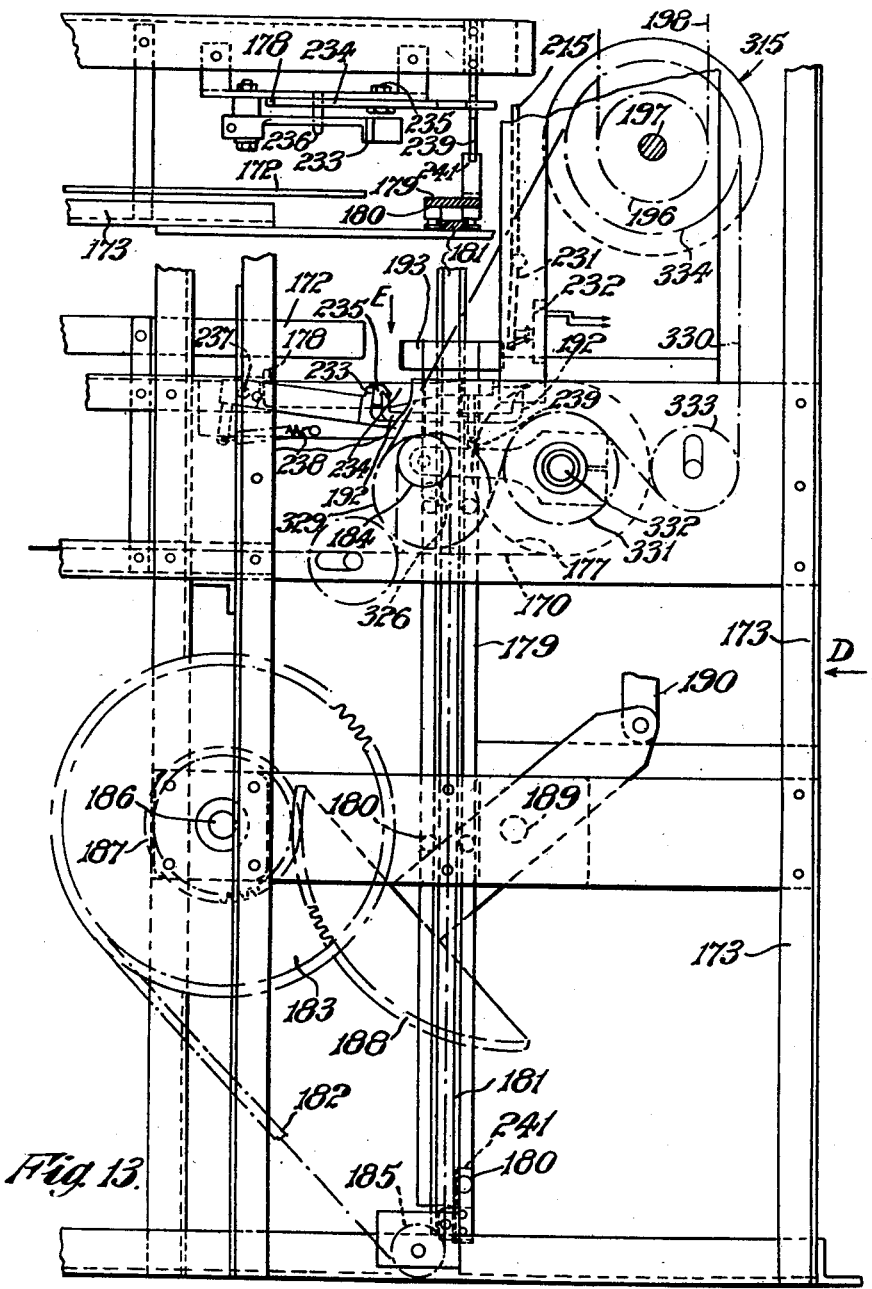

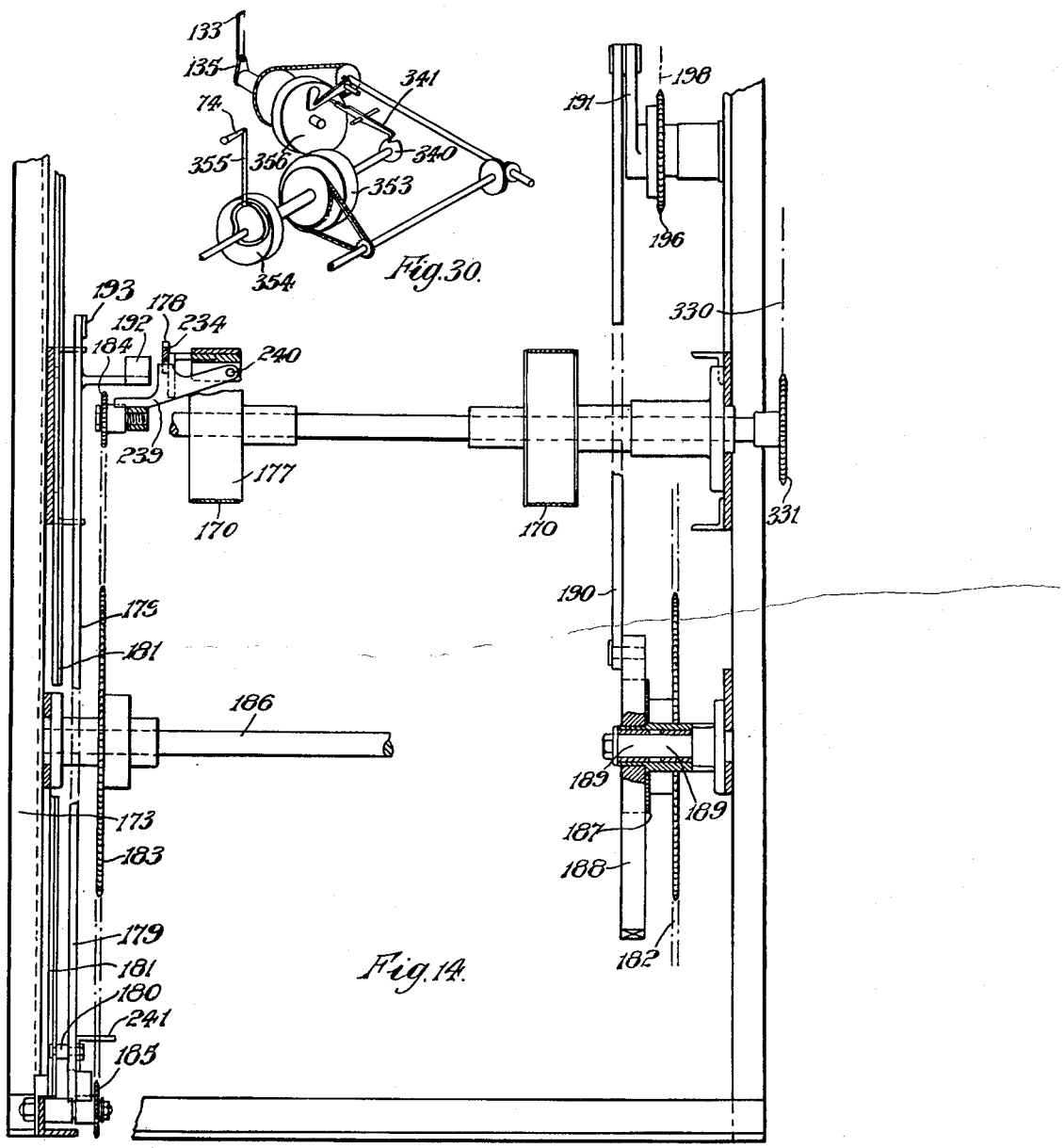

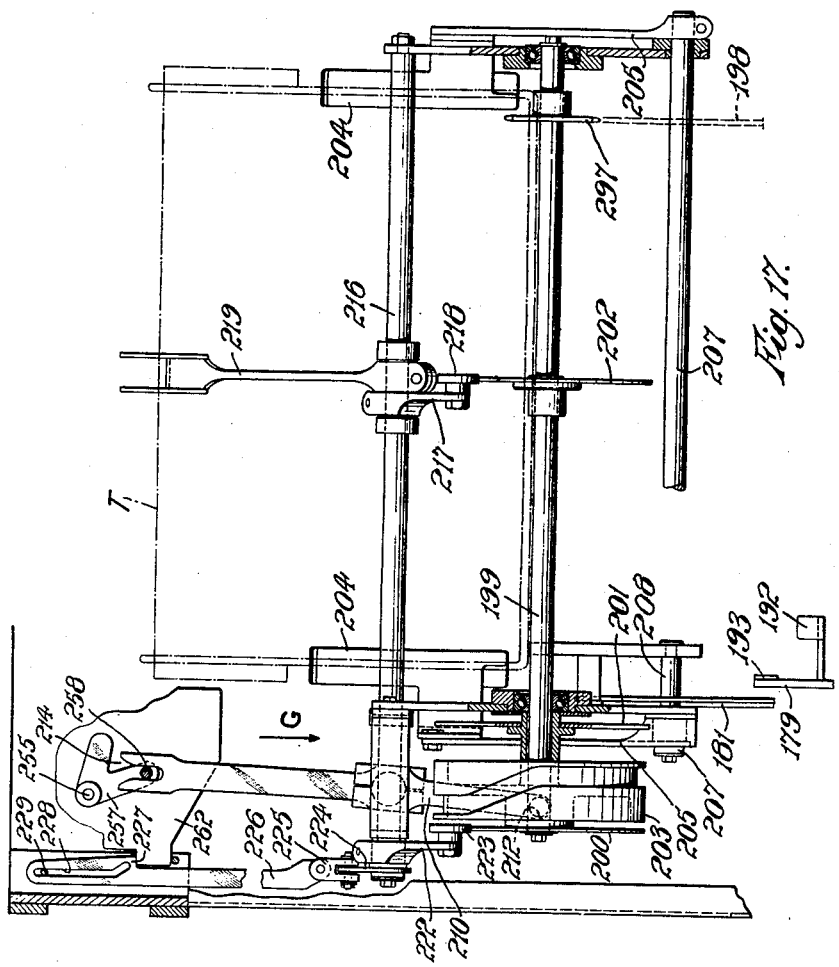

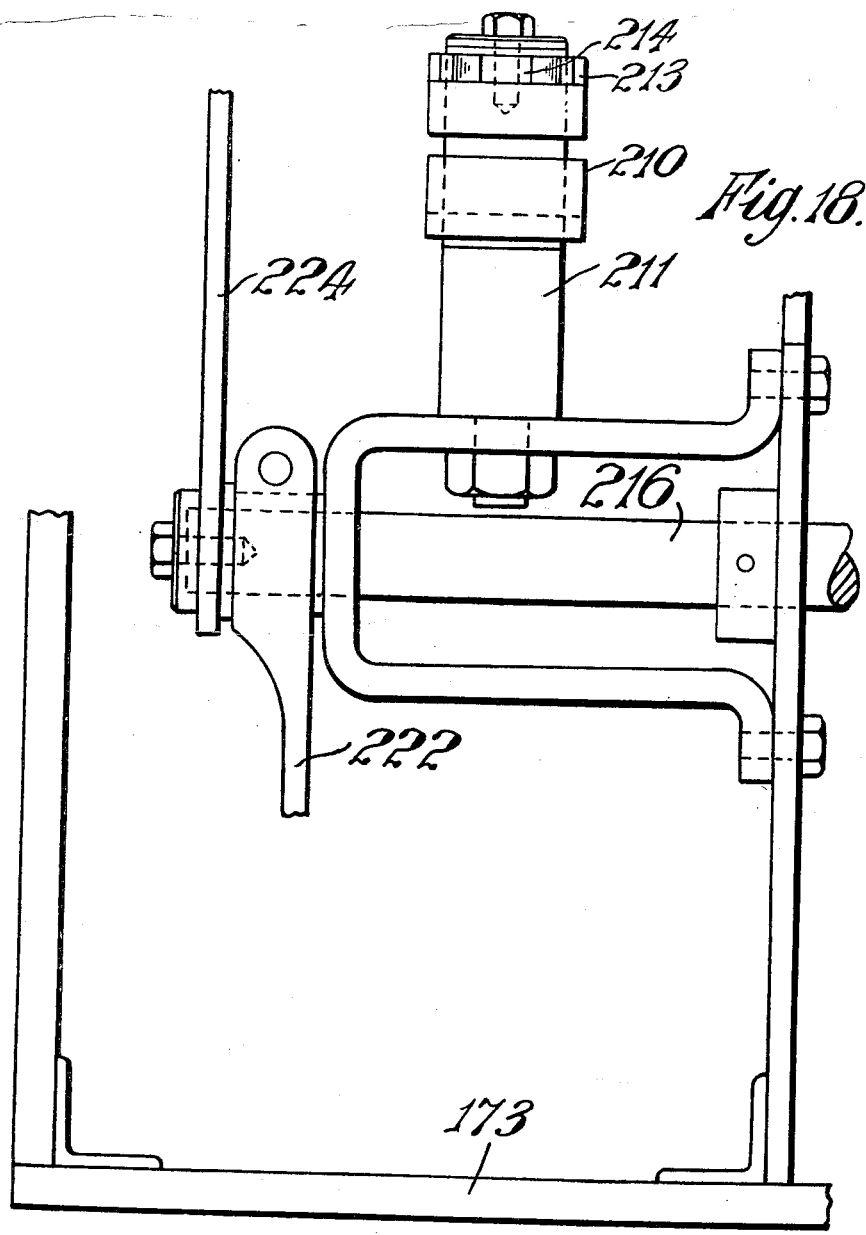

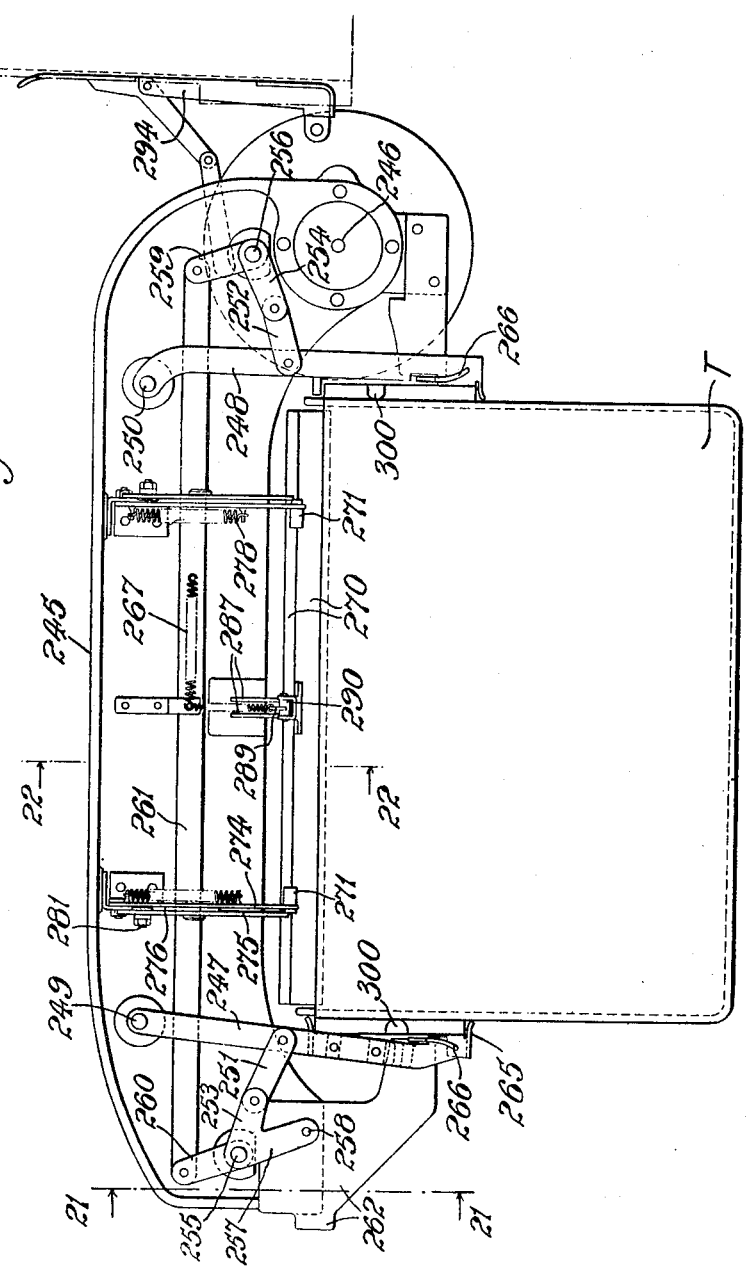

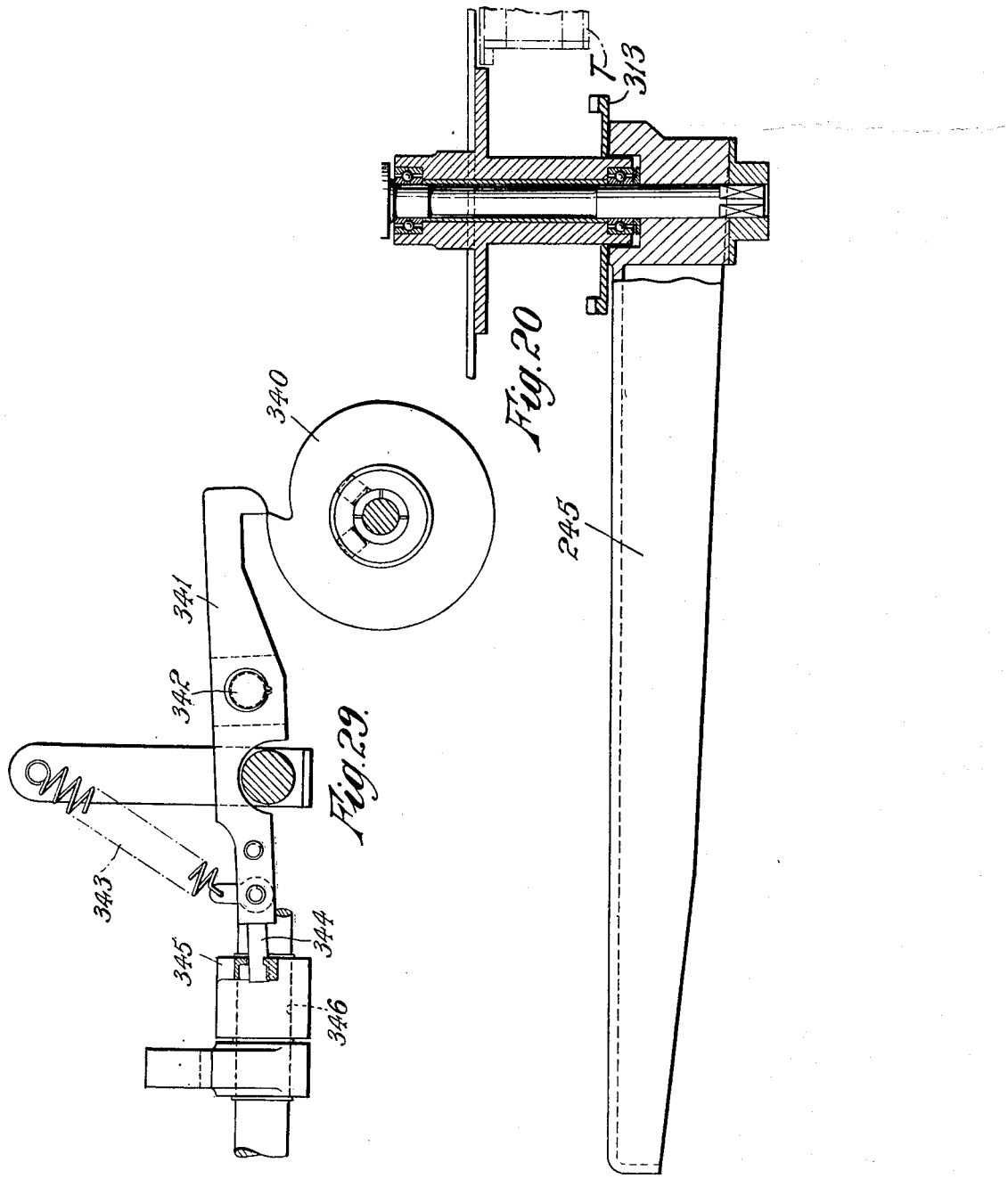

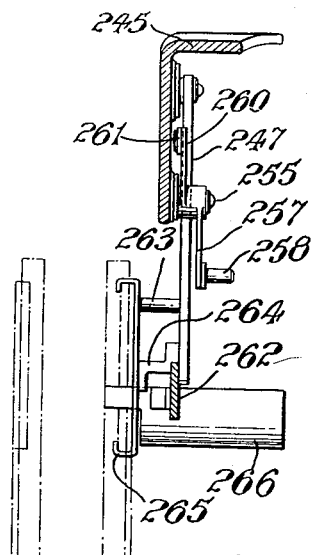
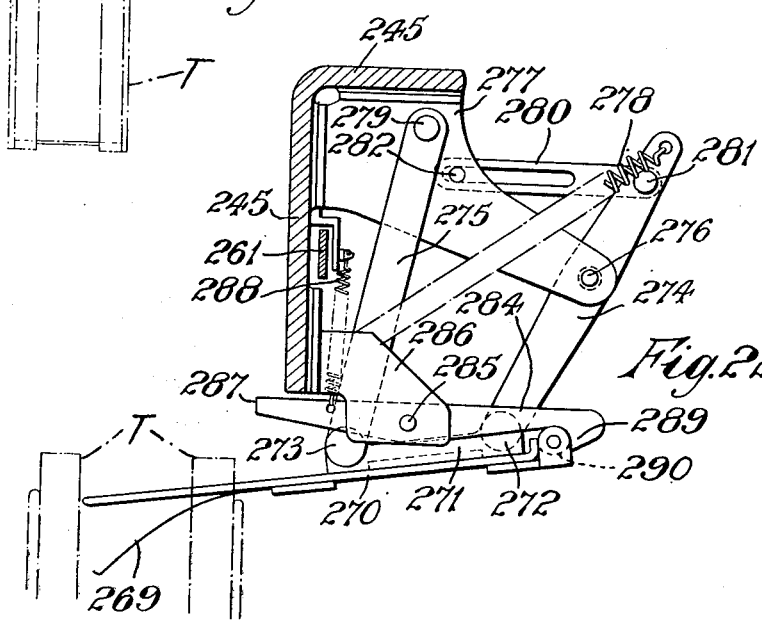

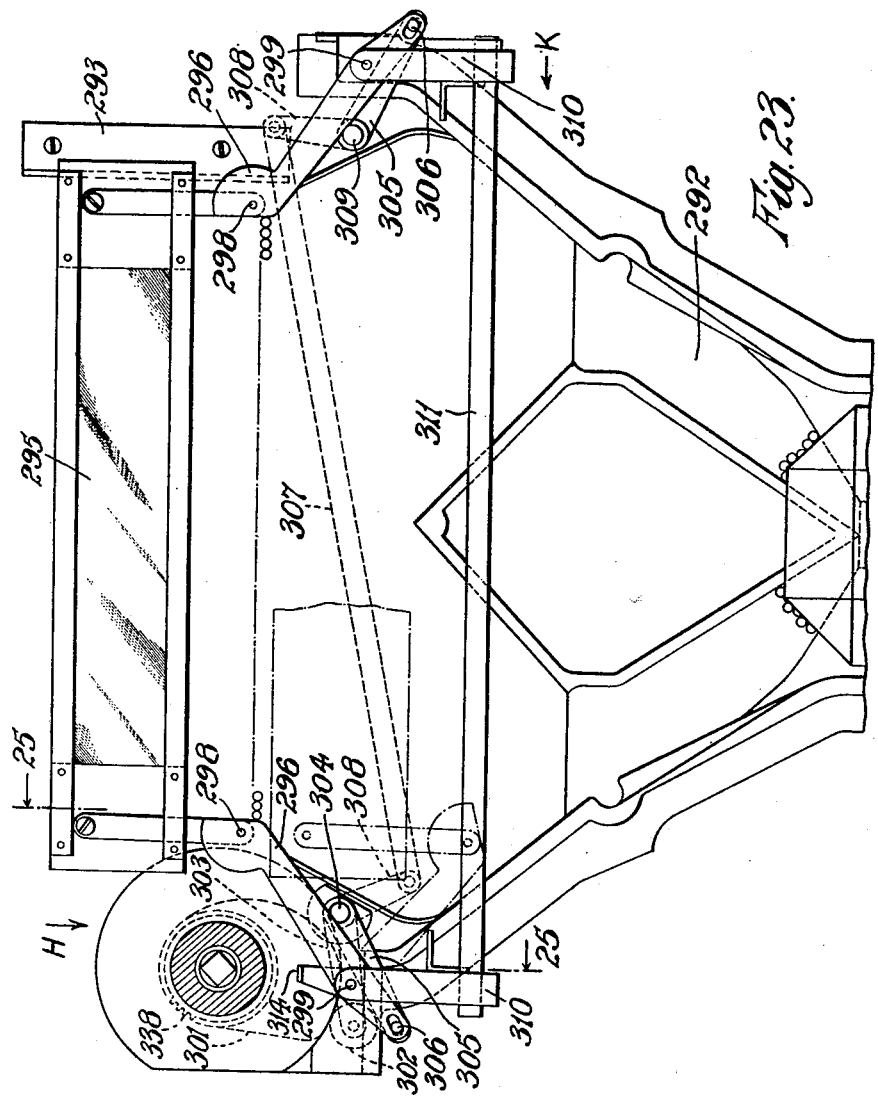

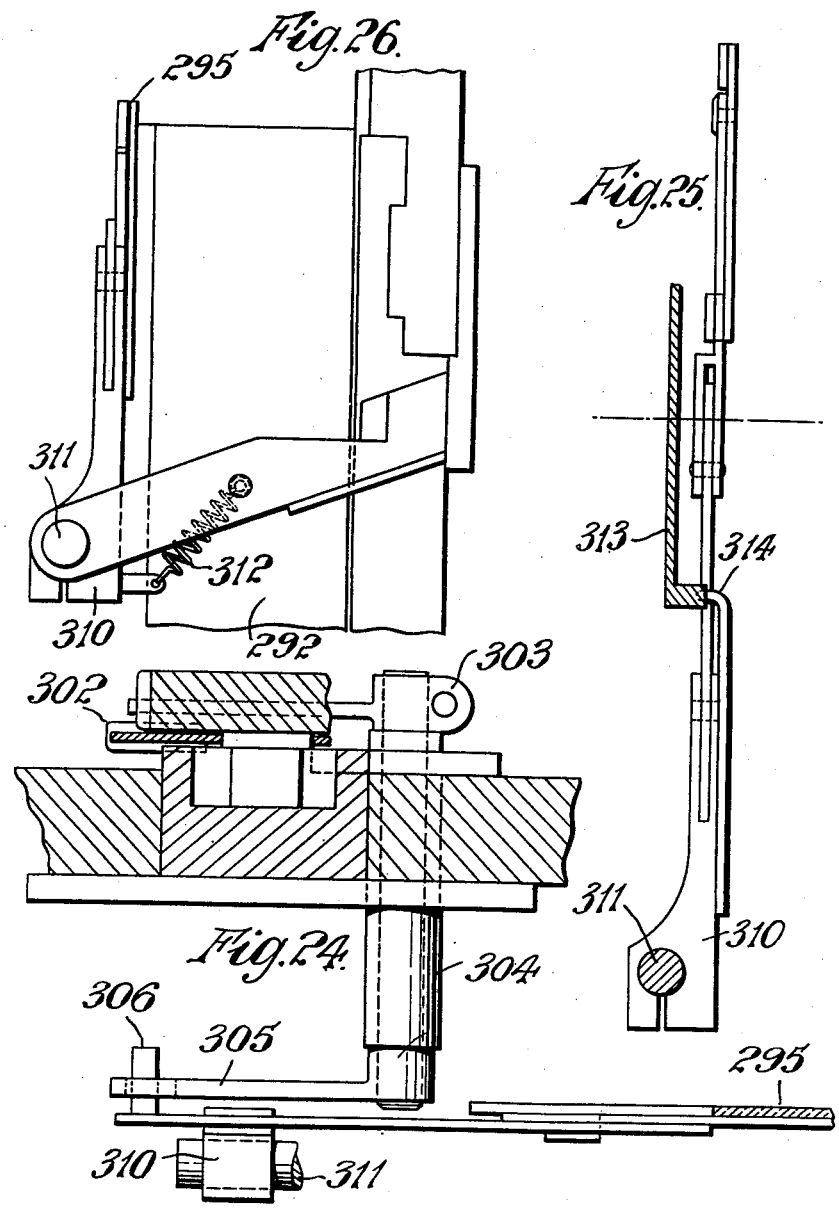

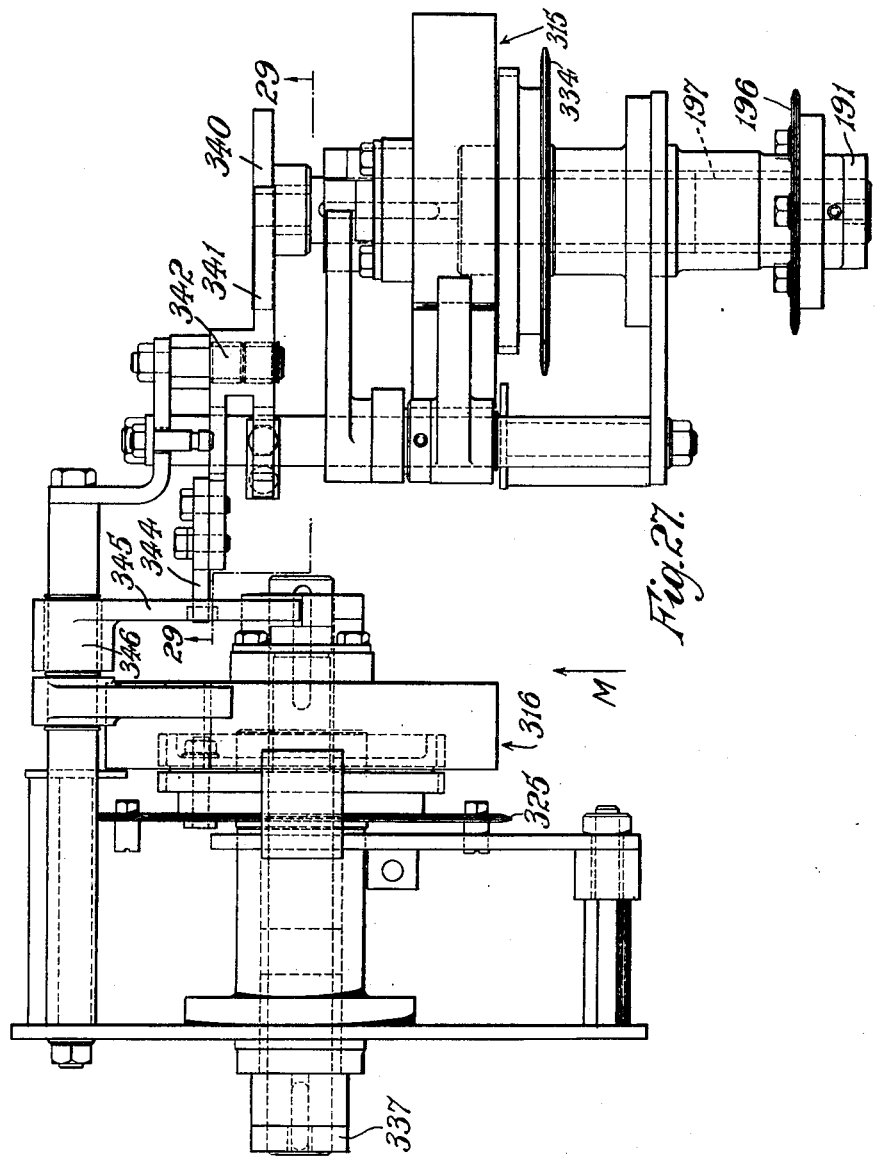

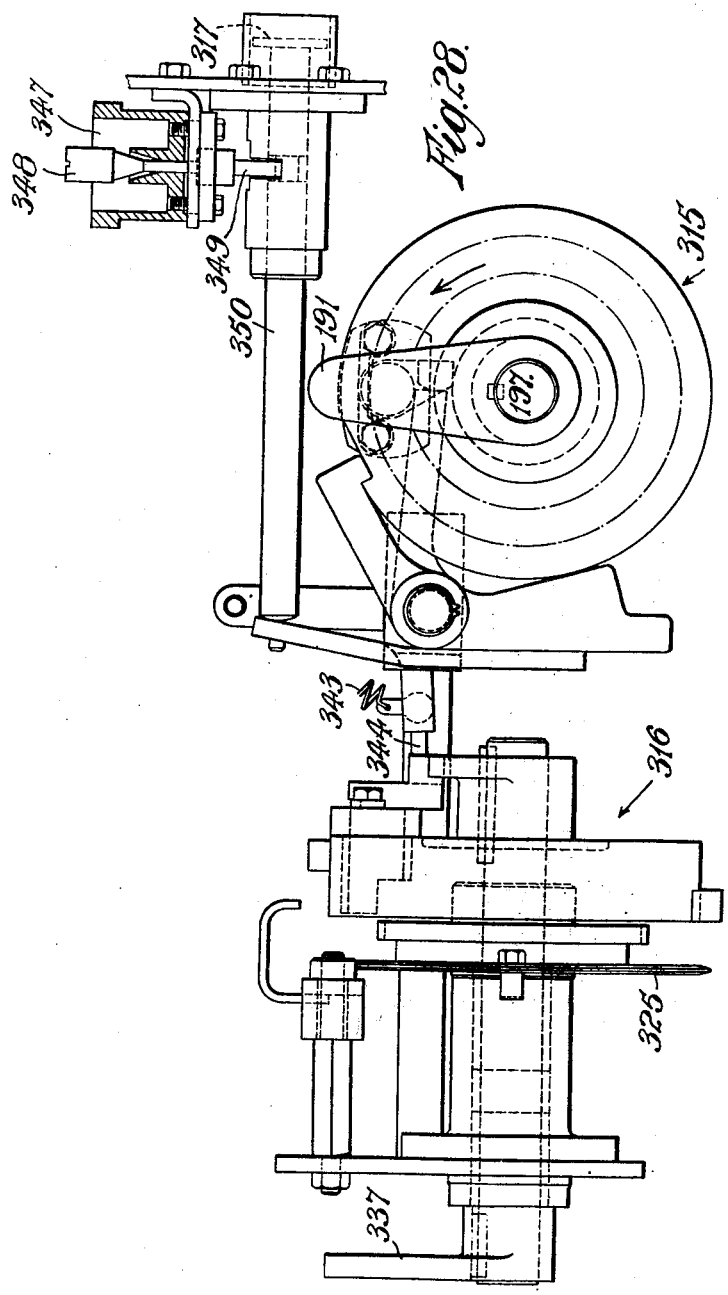

2,681,160

UNITED STATES PATENT OFFICE 2,681,160

HANDLING OF CIGARETTES OR OTHER ROD SHAPED ARTICLES

Desmond Walter Molins and Felix Frederic Ruau, London, England, assignors to Molins Machine Company Limited, London, England, a British company Application April 1, 1952, Serial No. 279,752

Claims priority, application Great Britain April 5, 1951

7 Claims. (Cl. 214—302)

This invention concerns improvements in or relating to the packing or handling of cigarettes or other rod shaped articles.

In United States patent application Serial No. 89,502 there is described apparatus for discharging the contents of cigarette trays into the hopper of a cigarette packing machine. In that apparatus the trays are put by hand one at a time into a device termed a charger which is thereafter automatically inverted over the hopper and opened to discharge the cigarettes and then returned to the loading position.

It is sometimes the practice to make and pack cigarettes in the same room and under these circumstances it is very convenient to accumulate a store or magazine of loaded trays near each packing machine and such a magazine may conveniently take the form of an endless conveyor from which a tray can be removed by the charger device which is suitably modified for this purpose, and returned thereto when empty. Such an arrangement is also convenient in those factories where the trays are moved about the factory on conveyor belts.

It is also common to transport trays of cigarettes about tobacco factories in trucks and it will be understood that the manual removal of a tray from a truck, its insertion into the charger, and the disposal of empty trays, takes up part of an operator's time and energy which may be more usefully employed in attending to more technical matters concerned with the proper running of the packing machine. Moreover it is highly desirable that trays, which can be filled automatically from a cigarette machine, should be subjected to the minimum amount of handling, not only from the point of view of labour saving but to preserve the quality of the cigarettes which is easily spoilt by jarring, vibration, or unnecessary movement.

It is therefore proposed in one form of the invention to provide a truck which is not only suitable as a shop truck for conveying trays about a factory, but which is so designed that it can be coupled to apparatus of the kind referred to above so as to form a magazine to supply said apparatus and become temporarily a part of such apparatus, so that a tray can be removed from a truck by the charger device and returned thereto when empty.

In another construction for use in cases where cigarettes are made and immediately packed, a conveyor may be used instead of the truck. A single packing machine can be arranged near two cigarette making machines so that filled trays may be carried across to the packer. Each packer has a conveyor device consisting of two endless conveyors one being mounted above the other, an elevator of suitable kind being provided at one end to raise trays from the lower conveyor to the other. Full trays are placed on the lower conveyor and move towards the elevator. Trays arriving on the upper conveyor move towards the charger and the empty trays pass to the other end of the conveyor which is just above the tray feeding position of the lower conveyor.

In either arrangement the apparatus may be arranged for fully automatic working, operating in cycles each initiated by movement of a starting button or equivalent device.

According to the invention there is provided apparatus for discharging the contents of cigarette trays into the hopper of a cigarette packing machine comprising in combination a support on which trays are arranged, means for moving the trays towards a position where a charger is adapted to remove a tray from said position and invert it over the machine hopper and return the empty tray to said position, means for thereafter moving the trays to bring a fresh tray into position where it can be engaged by the charger, and driving means set into operation by a press button or like device and adapted to move the apparatus through a cycle in which one tray is inverted and returned and a fresh tray brought into said position, whereupon the apparatus stops.

There may be provided side guides on the machine hopper, between which the inverted charger is disposed when in the discharging position, so that any cigarettes which may leave the charger after the latter has started to move away will be guided into the hopper, and a guide surface against which the ends of cigarettes discharged by the charger are capable of being aligned and by which piled cigarettes can be given lateral support.

For some purposes two conveyors may be used, one being a loading conveyor arranged beneath the other, which presents the trays to the charger, with suitable lifting means for raising trays from the lower conveyor to the upper conveyor.

The charger may be continuously movable through a cycle, from a loading position to a discharging position and back again, for example the charger may swing to and fro on a pivot between said positions.

As above mentioned the inverted charger is disposed between the side guides, that is the latter lie outside the inverted charger and the trays may be slotted at their ends and the said guides so shaped that they may engage cigarettes through said slots so as to ensure effective guiding and control of cigarettes emerging from a tray. Any suitable arrangement of slots and guides so as to secure fork-like interlacing may be employed.

A movable cover may be provided on the charger to close the top of the tray while the latter is moving over to the discharging position, said cover being arranged to move out of the closure position when discharging is to take place, the movement being away from the said guide surface.

In order to align the cigarettes with the aforesaid guide surface and also to provide a fourth guide for the discharging cigarettes, a further guide may be provided parallel with said guide surface and movable towards and away from said surface, whereby cigarettes can be moved lengthwise into contact with said guide surface. The upper edge of this fourth guide may be lower than the upper edge of the aforesaid guide surface to allow space for the movable cover which covers the cigarettes in the tray to move out for the discharge of cigarettes.

Further according to the invention, there is provided apparatus for discharging the contents of cigarette containers or trays into the hopper of a cigarette packing machine, comprising in combination a shop truck adapted to support a number of trays thereon in spaced relationship, means for coupling the truck to said apparatus and moving it by stages equal to the spacing of the trays, a charger adapted to remove a tray from the truck and invert it over the machine hopper and return the empty tray to the truck and means for thereafter moving the truck a stage to bring a fresh tray into position where it can be engaged by the charger.

The truck may be movable along a path substantially parallel to the axes of the cigarettes in the machine hopper, and the trays located thereon so that the axes of cigarettes in the trays are parallel to those in the hopper.

The movements of the apparatus may be effected by electrical devices or mechanically from the packing machine drive, as by a one-revolution clutch, the movement in either case being initiated by a press button or the like. The one-revolution clutch is specifically described herein but the application of equivalent electrical control will be obvious from the description.

Means, more specifically described later, may be provided to ensure that all the cigarettes in a tray are discharged into the hopper as any cigarettes not so discharged might be spoiled or wasted.

The truck can be moved along its path a distance equal to the pitch of the trays supported on it, by a manually operated lever or the like the movement being utilised to actuate other devices which prepare a tray for discharge so that the only other movement necessary is the pressing of the button. As an attendant is always in attendance near the hopper, manual control of the charger and manipulation of the truck is simple and economical but it is possible to link the two devices so that the whole apparatus is automatic.

Sundry safety devices described later are also included in the invention.

Two constructions according to the invention will be described with reference to the accompanying drawings in which:

Figure 1 is a perspective view of one construction showing the general arrangement of an apparatus arranged to remove trays from a truck and discharge them into a hopper of a cigarette packing machine.

Figures 2A and 2B together show a front elevation of a charger shown in Figure 1 and drawn to a larger scale.

Figure 3 is a section of part of Figure 2A on the line 3—3.

Figure 4 is a section of part of Figure 2A on the line 4—4.

Figure 5 is a section of part of Figure 2B on the line 5—5 but also shows other parts which co-operate with the parts shown by the section.

Figure 6 shows mechanism for moving a truck along to bring trays supported thereon one by one into position for engagement by the charger.

Figure 7 is a view of part of Figure 6 looking in the direction of the arrow A.

Figure 8 is a section of Figure 2B on the line 8—8.

Figure 9 shows part of the charger and several guides for directing cigarettes into the hopper.

Figure 10 is a sectional elevation of part of Figure 2B looking in the direction of the arrow B and showing details of a clutch device.

Figure 11 is a side elevation of a modified form of the invention.

Figure 12 is a front elevation of Figure 11 looking in the direction of the arrow C.

Figure 13 is a view of part of Figure 11 drawn to a larger scale.

Figure 14 is a view of Figure 13 looking in the direction of the arrow D and partly in section.

Figure 15 is a plan view of part of Figure 13 looking in the direction of arrow E.

Figure 17 is a view of Figure 16 looking in the direction of the arrow F.

Figure 18 is a plan of part of Figure 17 looking in the direction of the arrow G.

Figure 19 is a front elevation of a charger ready to engage a tray.

Figure 20 is a plan of part of Figure 19, partly in section.

Figure 21 is a section of Figure 19 on the line 21—21.

Figure 22 is a section of Figure 19 on the line 22—22.

Figure 23 is a front view of the hopper of the packing machine showing a guide for cigarettes and operating devices therefor.

Figure 24 is a plan of part of Figure 23 looking in the direction of the arrow H.

Figure 25 is a sectional view of part of Figure 23 on the line 25—25.

Figure 26 is a view of part of the right hand end of Figure 23 looking in the direction of the arrow K.

Figure 27 is a plan view of part of Figure 12 showing details of two clutches to a larger scale.

Figure 28 is a view of Figure 27 looking in the direction of arrow M.

Figure 29 is a section of Figure 27 on the line 29—29.

Figure 30 is a diagram illustrating the application of a clutch system as shown on Figure 12 to the construction according to Figure 1.

Figure 1:
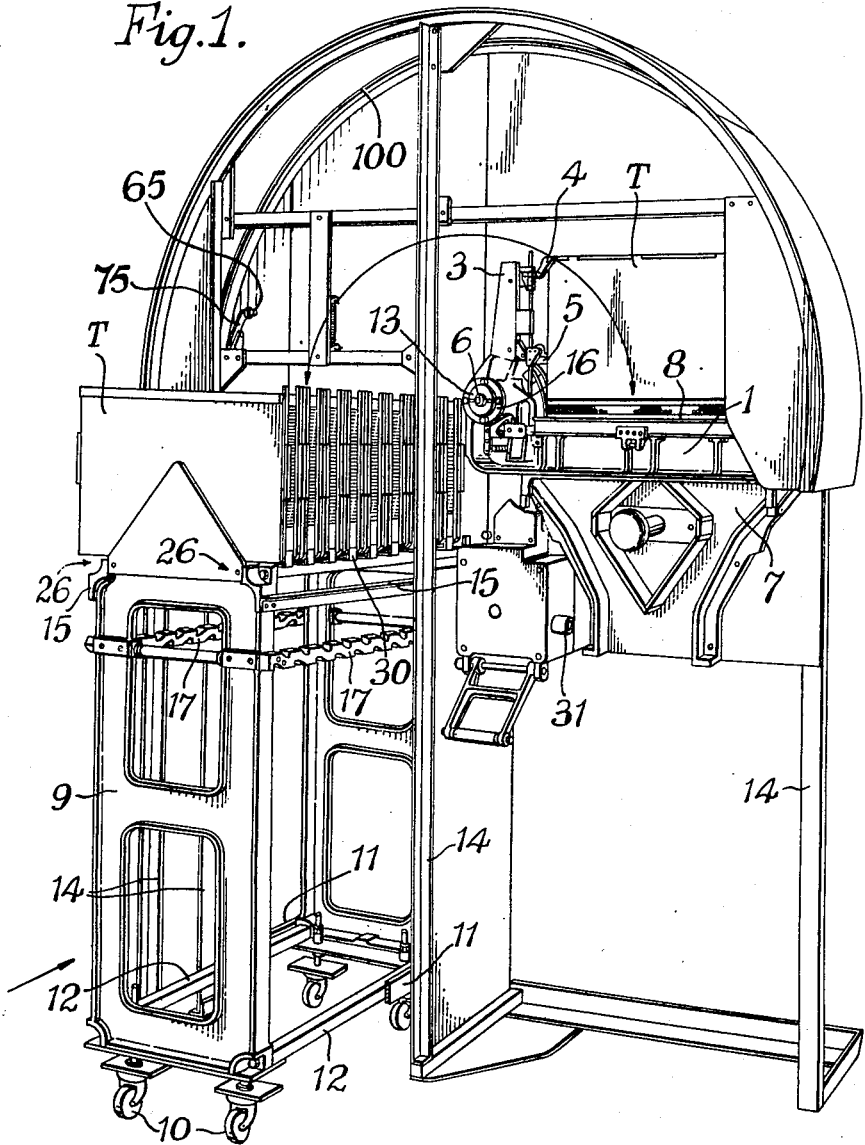

Referring first to the construction shown in Figures 1 to 10 the apparatus will be described first briefly, chiefly with reference to Figure 1, so that the general motions are understood and then the various mechanisms for effecting the motions will be dealt with in detail. The charger is a pivoted stirrup shaped device having a straight upper limb 1 and side limbs 2 and 3 which are wide enough to straddle a tray T, that is, wider than the length of a tray, and provided with suitable gripper or tray-engaging devices 4 and 5 which extend laterally therefrom so that the stirrup may be brought into position over a tray, at the left-hand side in Figure 1, whereupon the grippers are caused to engage the tray. The charger is then rotated on its shaft 6 to invert the tray and discharge the cigarettes into a hopper 7. The charger is shown in the discharging position in Figure 1, the hopper, which is only indicated diagrammatically, being of a well-known kind.

The tray T, as seen best in Figure 1, has side plates and is like a box with an open top and slotted ends for a cigarette guide to enter and leave the tray when it is being filled at the cigarette making machine. A tray cover 8, described in detail later, is provided on the charger to prevent cigarettes from falling out of the tray as the latter is turned over.

At the side of the packing machine of which the hopper 7 forms part and beneath the position occupied by the charger when ready to receive a tray is a path for a truck 9, any suitable guiding devices or rails being provided to ensure that the truck moves in a straight line. As it is convenient for moving a truck about a factory to have caster-action wheels 10 the guides may be parallel strips adapted to engage side members of the truck and steer it so that the wheels follow the guiding action. Such guides are shown in Figure 1 and marked 11. They are flat strips but the left-hand one is bent outwards at its free end to provide a converging space between the guides, for easy entry of the truck. These strips co-operate with side bars 12 of the truck. The strips are attached to a built-up framework 14 which supports the charger and other parts of the apparatus. The truck is also guided at the top by suitable strip guides attached to the framework but not visible in the figure. Angle iron strips 15 fixed to the truck rub against said strip guides. The truck is a fairly high structure and so arranged that the tops of the trays on the truck are substantially level with the axis of the charger pivot, see Figure 1. A racking device, described later, is provided and arranged to engage a rack bar 17 on the truck whereby the truck may be intermittently moved along the track by distances equal to the pitch of the trays on the truck, where the trays are spaced slightly apart so that the pitch is tray thickness plus say ½" or cigarette length plus say ⅝". Two rack bars are provided, one at each side of the truck, so that it does not matter which end of the truck is pushed in between the guides 11. The top of the truck is provided with tray supporting devices 30 to space the trays laterally and locate them with respect to the truck width.

In use, a truck is brought to the machine and arranged in the guides and the racking device coupled to the truck, and the charger engaged with the first tray. The truck is brought up to the machine so as to approach the hopper, and thereafter to move past it, the line of movement being indicated by a straight arrow in Figure 1. When the supply of cigarettes in the packing machine hopper is sufficiently depleted the operator presses a button 31, the charger swings over and then returns and deposits the empty tray in the same position on the truck. The charger motion is indicated by a curved arrow in Figure 1. Then, or at any rate before a fresh tray-full of cigarettes is needed to recharge the hopper, the racking device operates and the truck is moved forwards one tray pitch. The operations are repeated until all the trays have been emptied and then a fresh truck is wheeled into position by the machine. The movements of the fresh truck can be utilised to push the empty truck away, if desired, and the truck ends can be so shaped that the pitch of the trays is preserved, so that one truck forms a continuation of the preceding one.

Figure 2B:
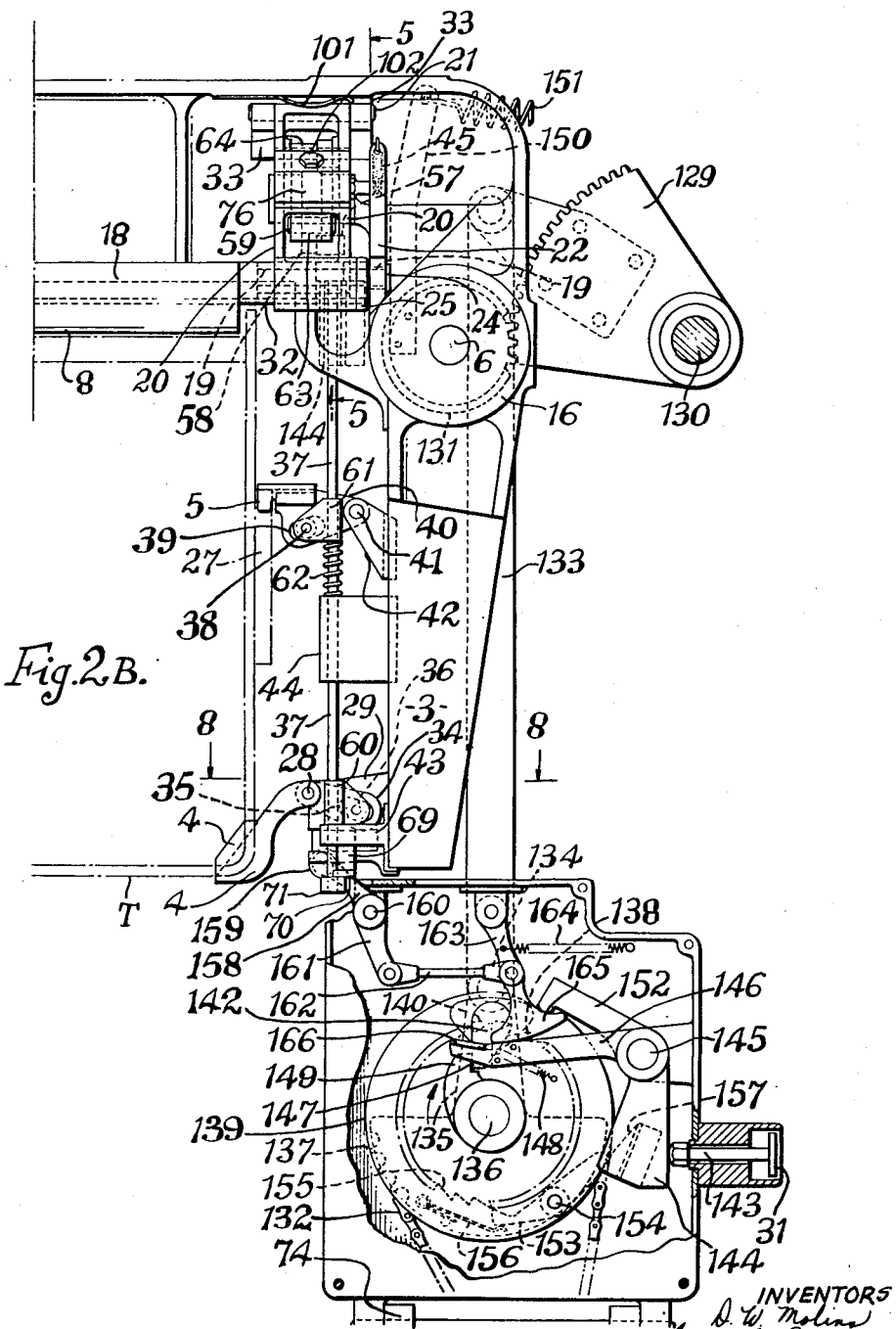

Referring now in more detail to the various parts and to Figures 2A to 10 the charger stirrup is a casting and, as considered when engaging a tray on the truck, has the upper limb 1 horizontal with the two side limbs 2 and 3 depending at right angles to the upper limb. The distance between the side limbs is about 6" more than the length of the tray and in the clearance at each side between the limbs and tray are the tray engaging devices 4 and 5. Near to the top, the side limb 3 has a boss 16 forming a bearing which fits on a stub shaft fixed to the packing machine, the shaft 6 being fixed to the shaft by a flange 13. A one-revolution clutch system, to be described later, is set into operation by the starting button 31 and when the button is pressed the charger swings over and later returns to its initial position and stops. The upper limb 1 of the charger is of L section with the horizontal web of the L at the top and the vertical web at the back, as seen in Figures 2A and 2B, and within the angle of the L and attached to the vertical web are several devices now to be described.

The tray cover 8 previously mentioned extends along a tray when in the charger. The tray cover, which is then substantially horizontal, comprises a metal plate projecting from the charger beneath the upper limb thereof.

Referring mainly to Figure 5 the cover plate 8 is fixed to an angle-iron member 18, which is in turn fixed to an angle section bar 32 pivoted at each end by a pivot 19 to a link 20 whose upper end is pivoted at 21 in a bearing 33 fixed inside the angle of the L of the stirrup limb. When a tray is in the charger and covered, the pivots 19 and 21 are substantially in a vertical plane. At each end of the upper limb of the charger just beyond each of the links 20 is a cam plate or bracket 22 fixed to the vertical web of the charger limb, and projecting outwards at right angles thereto. In each plate is a slot 23 which starts as a circular arc at the inner end, that is, the fixed end, and after about 2¼" changes into a straight slot. A pin 24 is arranged to travel along the slot and is fixed to a bracket 25, which is fixed to the angle section bar 32 and thus movement of the angle bar by the pin 24 will twist the angle iron 18 and the cover 8 by pivotal movement of the angle section bar in its supporting links 20. The shape and disposition of the cam track provided by the slot is such that as the links 20 swing on their pivots 21, the cover plate is lifted and steered by the pins 24 sufficiently to avoid striking the edge of the tray.

The tray-engaging devices 4 are in the form of shoes each arranged to slide beneath a lower corner of a tray and engage the corner in much the same manner as a shoe engages a heel of the wearer. The top of the truck is suitably shaped at 26 Figure 1 to allow the shoes to pass beneath the tray corners. The other tray engaging members 5 are arranged as two steadying devices to engage lugs or the like 27 (described below) on the ends of the tray, the lugs being about two-thirds of the height of the tray from the bottom thereof. Each shoe 4 is formed as a lever pivoted at 28 to a bracket 29 fixed to a side limb of the charger near its lower end. The lever has a tail 34 which has a slot 35 in it in which a pin 36 fixed by means of a bracket 60 to a vertical axially movable rod 37 engages so that the lever 34 is rocked on its pivot 28 as the rod moves up and down. Downward movement of the rod slides the shoe under the corner of the tray and upward movement of the rod moves the shoe clear of the tray. A steadying device 5 is arranged in much the same way. A pin 38 fixed to the vertical rod by means of a bracket 61 engages a slot 39 in a lever 40 pivoted at 41 on a bracket 42 fixed to the charger side limb, and downward movement of the rod 37 causes the lever 40 to swing and the steadying device 5 to engage the lug 27 on the tray, while upward movement disengages the parts. A tray lug 27 is a narrow strip, actually part of the tray side projecting at right angles to the tray end and parallel to the tray front and back planes, and a steadying device is shaped at the operative part like an inverted V so that engagement between the parts is ensured. The vertical rod is slidable in guides 43 and 44 and 144 fixed to the charger limb and is moved upwards by a spring 62 surrounding the rod, and downwards by means to be described presently.

The above-mentioned links 20 which support the angle iron 18 and tray cover 8 are held in tray covering position, that is, the position shown in Figure 5, against the influence of tension springs 45, by a latch device which will now be described, chiefly with reference to Figure 4. The latch comprises a hook shaped latch 46 fixed to a rod 47 pivoted in several brackets, 48, on the upper limb of the charger, the hook being about midway along the upper limb of the charger and shaped to hook over a pin or roller 49 mounted on a pair of brackets 50 fixed to the angle section bar 32. The hook has a thumb piece 51 by which it may be manipulated if it should be desired to operate it manually to latch or unlatch the pin 49. The thumb piece is also shaped so that the hook 46 will catch over the pin 49 if the latter is pressed against it. At the left-hand end, Figure 2, the rod has a double-armed lever fixed to it whereby it is twisted to release the hook when a screw 52 in an end 53 of the lever strikes an abutment 54, Figure 3, as the charger moves into position with a tray above the hopper. A spring 55 attached to the other end 56 of the lever restores the lever and rod to latching position when the lever is clear of said abutment.

The vertical rods 37 are moved upwards by the previously mentioned springs 62 surrounding the rods and are pressed downwards by rollers 57 on the ends of levers 58, Figure 5, which are pivoted at 59 to brackets 63 fixed to the vertical web of the top limb of the charger. The levers 58 are pressed by rollers 64 mounted in the levers 20 and the latter are pressed to rotate anti-clockwise about their pivots 21 by rollers 65, Figure 5. As these rollers and their associated parts are supported from the framework 14 and are actuated by the truck racking devices, further description will be deferred, but the nature of the movement of a roller 65 can be gathered from Figure 5 where it is shown in upper and lower positions.

Since the rods 37 are urged upwards by springs, locking devices are provided to hold them in the down position when they have been pressed down as described above. A vertical rod locking device comprises a horizontal double armed lever pivoted at 66 at the bottom of a charger side limb, see Figure 8. One arm 67 of the lever is pulled by a spring 68 and the other arm 69 has a lug 70 suitably grooved to embrace the rod 37 and which engages the upper face of a collar 71 fixed to the neighbouring vertical rod so that the latter cannot move up under the influence of its spring and thus the rod is held down in tray engaging position.

It is convenient to describe the remaining charger details together with the operation of the device. Assuming that the charger is just returning with an empty tray, the tray cover 8 will be in the open position. Fixed abutments attached to the frame 14 and indicated diagrammatically at 72, Figure 8, strike the locking devices 67—69, which hold the vertical rods in tray engaging position, just as the charger reaches its rest position by the truck. This action releases the empty tray from the shoes 4 and steadying devices 5.

The truck 9 is moved by an operating lever 14, Figures 1 and 6, and after the truck has been moved forwards one pitch, the reverse movement of the operating lever is used to move the cover 8 to tray covering position as will now be described. As the cover moves to tray covering position, the pin 49 mounted on the angle bar 32 slides beneath the hook of the latch 46 to retain the parts in position against the tension of the springs 45. Referring now to Figures 5, 6 and 7, the tray cover 8 is moved in to tray covering position by levers 75 provided with the previously mentioned rollers 65 on their free ends which press on sloping plates or cams 76 fixed to the cover supporting links 20. The levers 75 are operated by a common rock shaft 77 which is journalled in brackets 78 attached to the framework 14. The levers 75 are pulled downwards to effect tray covering by a substantially vertical link 79, pivoted to a lever 80 at 81, which is coupled to the truck operating lever 74 as described later, a spring 82, Figure 5, being provided to urge the vertical link 79 upwards. The roller carrying levers 75 which cause pressure on the sloping cams 76 are pivoted at 83 to the levers 80 fixed to the rock shaft 77, and held in the operative position against stops 84 by springs 85. The roller levers 75 can therefore twist on their pivots against the spring pressure to click past the cams 76, as when the link 79 moves upwards the tray cover is in the uncovering position so the cams 76 are some distance to the left of the position shown in Figure 5. This movement of the cover plate 8, and the associated movement of the cover supporting links 20, is used to operate the shoes 4 and tray steadying devices 5 in the manner previously described. When therefore, the lever 74 is operated, and the truck has moved forwards one pitch the shoes and steadying devices engage the new tray in the manner previously described. The button 31 is pressed and the loaded charger moves away from the truck. As soon as the vertical rod locking devices 67—69 are clear of the fixed abutments 72 they spring in to engage the collars 71 and lock the rods against upward movement. As the tray comes into position over the machine hopper, the double-armed lever 53—56 fixed at one end to the round bar 47 which carries the hook latch 46 strikes the abutment 54 on the machine. To avoid unnecessary illustration the abutment 54 is shown in chain lines on Figure 3 but in fact when the screw strikes the abutment the charger has reached discharging position so the parts shown in full lines are actually upside down and the face of 54 which the screw strikes is actually the upper face of the casting. The screw 52 is provided in the lever for fine adjustment. The round bar 47 is twisted in its bearings and the hook latch is swung to unlatch the angle bar 32 and tray cover. Immediately, these swing round on the pivots 21 of the cover supporting links 20, under the action of the springs 45 on the links, the cover being guided by the slotted cams 22, as previously described to clear the edge of the tray.

The cigarettes commence to fall from the tray into the hopper and the charger starts to return, the falling cigarettes being guided meanwhile by suitable front, back and side guides shown in Figure 9. The back guide is provided by a plate 86 which forms an extension of the rear wall of the hopper 7 while the front guide consists of a movable framework 87 having a transparent cover 88. This framework is pivoted at 89 to the hopper frame and oscillated on its pivots as described below.

The right hand side guide consists of an angle 95, fixed to the plate 86 while the left-hand side guide 96 is a collapsible structure. This side guide is made in two parts pivoted and sprung so that normally the whole device stands erect on a pivot 97 at its base where a torsion spring and stop are provided. The upper part 96A of the guide is pivoted to the lower part at 98 and the pivot also comprises a torsion spring and a stop. The stops keep the two parts erect as they are urged against the stops by the springs. As the tray swings over to the discharge position the guide parts are bent round in turn on their pivots as shown in chain lines and against the influence of the springs by the cigarettes in the neighbouring corner of the tray but at a later stage of the movement the guide parts escape from contact with the tray and once more assume the erect position so as to constitute a guide for the falling cigarettes. On the return movement the guide stays erect and enters the neighbouring slot in the side of the tray and causes all the remaining cigarettes to be pushed out of the tray as the latter moves past the guide. The framework 87 constituting the front guide of the hopper is oscillated on its pivots 89 by a crown cam 90 and a spring (not shown) to assist in aligning and feeding the cigarettes by lightly heating their ends. The cam operates a cam lever 91 attached to the framework 87 and during filling from a tray it is desirable to keep the framework in the open position. This is done by providing a plate 92 on the charger which enters a slot 93 in a plate 94 attached to the framework 87 and holds the cam follower clear of the cam.

The charger returns to rest near the truck, the rod locking lugs 70 are unlatched, as described, and the truck can be moved along another pitch as soon as desired. As the charger is a large structure and moves on a single pivot its outer limb comprises a series of thin guide plates 99 which move in a semicircular grooved track 100, to steady the charger throughout the movement.

The tension springs 45 which move the tray cover when the latch is released are powerful and the cover moves back very quickly. Buffer springs 101, Figures 2 and 5, are therefore provided which engage studs 102 attached to the pivoted links 20 and prevent shock.

Referring now to Figures 6 and 7, the truck as previously mentioned has a rack bar 17, in whose depressions truck moving and locking pawls can engage as described below and the pitch of the teeth of the rack is equal to the pitch of the trays. The truck is moved stage by stage by a pawl 103 which engages rack teeth 104 in the top of the bar 17 and is pivoted at 105 to a lever plate 106 pivoted at 107 to a machine frame. The operating lever 74 rocks the plate 106 to and fro. The lever plate 106 has pivoted thereto at 108 a double-armed lever, one end 109 of which is held by a spring 110 against a stop 111. The other end is formed as a toe 112. Movement of the lever plate in the direction of the curved arrow causes the toe to engage a surface 113 on one end 114 of a double-armed lever pivoted at 115 and held in the position shown in Figure 6 by a spring 116 and stop 117. The end 114 of the lever is formed as a detent pawl which engages rack teeth 118 cut in the lower side of the truck rack. These teeth are so arranged that the detent, when engaged, prevents forward movement of the truck, forward movement being indicated by a straight arrow. A simple detent or click 119 pivoted at 120 is arranged to engage the upper rack. In this way the truck cannot move forwards while the lower detent is engaged, nor backwards because of the click and is thus held substantially fixed in its proper position. The truck operating pawl 103 has a fair amount of lost motion so that as the lever 74 is pulled upwards, the lever plate moves first to release the lower detent 114 and then further to shift the truck.

As previously stated, the levers 75 which move the tray cover 8 to covering position are coupled to the truck moving devices by a substantially vertical link 79. It is, however, necessary first to shift the truck to bring a fresh tray into position where it can be engaged by the charger. The lever plate 106 has pivoted thereon a spring controlled pawl 121 which is pivoted at 122 and provided with a stop pin 123 whereby on the upward movement of the lever 74 the pawl can turn on its pivot but on the downstroke it cannot move. The above-mentioned substantially vertical link 79 is coupled at its lower end to a short lever 124 pivoted to the framework 14 at 125. A plate 126 is fixed to the lever 124. As the pawl 121 moves upwards on the truck moving stroke, a roller 127 on the end of the pawl engages the plate 126 and the pawl is turned thereby on its pivot 122 against the action of the spring 128. On the down stroke of the operating lever when the truck is fixed in its new position, the roller engages the plate 126 on the lever 124 and pulls the vertical link 79 downwards so that the roller carrying levers 75 connected to the upper end of the vertical link 79 press on the sloping cams 76 and move the cover 8 to the tray covering position.

The charger is rocked to and fro by means of a toothed quadrant 129, Figure 2, which is pivoted at 130 and engages a gear wheel 131 fixed to the charger pivot shaft 6. A connecting rod 133 couples the quadrant to a crank pin 134 fixed to a crank 135. This crank, as seen in Figure 10, is fixed on a shaft 136 and it is this shaft whose motions are controlled by the previously mentioned one-revolution clutch system set into operation by the starting button 31.

The clutch device is shown in Figures 2B and 10. The mainshaft of the packing machine, of which the hopper 7 forms part, is coupled by a chain 132 to the crank shaft 136 by means of the clutch device. Suitable reduction gearing is incorporated in the drive to the chain to obtain the desired speed of the shaft 136, since the mainshaft of the packing machine revolves at considerable speed. As will be seen from Figure 10, a sprocket wheel 137, over which the chain 132 runs, is bolted to a ratchet wheel 138. Coaxial with the sprocket wheel and ratchet wheel is a clutch body 139 in which is pivoted a rocking pawl tooth 140 which has a cylindrical shank 141 which is journalled in a hole in the clutch body. At one end of the shank is the pawl tooth 140 and at the other end is a stop lever 142. It will be seen that if the pawl is moved on its axis in an anticlockwise direction, Figure 2B, it will engage the ratchet wheel 138, and as the latter is constantly running in the direction of the arrow, Figure 2B, the pawl and clutch body will be rotated.

When the starting button 31 is pressed, its stem 143 presses against an arm 144 of a bell-crank lever pivoted at 145. The other arm 146 of the bell crank lever is thereby moved out of the path of an abutment 147 on the pawl stop lever 142. The pawl 140 then swings anti-clockwise, under the action of a spring 148, and the clutch body starts to rotate, and as it is keyed to the crank shaft 136 the latter is rotated and the crank 135 drives the connecting rod 133.

After the crank shaft starts to rotate, the arm 144 will of course fall back to the position shown in Figure 2B as the pressure on the starting button 31 is relaxed, and when the clutch body has made one revolution the arm 146 will strike the abutment 147 and disengage the tooth 140 from the ratchet wheel 138. A collar having a lug 149 is fixed to the shaft 136 so that the lug forms a stop to locate the stop lever 142 in the disengaged position. A pawl 152 drops into a recess in the clutch body at the end of the revolution to check any tendency the body may have to run back after disengagement of the clutch drive.

As the loaded charger is a fairly heavy mass, provision is made for balancing it as far as possible about the axis of rotation 6. For this purpose an arm 150 fixed to the gear wheel 131 extends upwards, Figure 2B, and to its end is attached a strong spring 51 whose other end (not shown) is anchored to the machine frame.

As the charger commences to swing upwards from the position shown in Figure 2B when it is, of course, loaded the spring assists the gearing. In due course, after the charger arm has rotated through 90°, the centre of gravity of the moving mass passes over the axis 6 and thereafter the spring tends to resist the movement. In this way the load on the gearing is kept fairly uniform and a smooth movement results. Moreover, as will be seen from Figure 2B, the crank is on a dead centre at each end of the movement, so that the charger starts to move slowly and finishes its movement slowly. Further the arrangement gives sufficient time for the cigarettes to discharge into the hopper 3 as there is scarcely any return movement of the charger for a considerable angle of crank movement.

As a further safeguard, in case the weight of the charger should drag the crank and clutch body in advance of the driving ratchet wheel 138, a ratchet stop device is fitted, also shown in Figures 2B and 10.

The stop device comprises a further pawl 153 pivoted to the clutch body at 154 and urged towards engagement with a ratchet wheel 155 by a spring 156 but, in the position shown in Figure 2B, temporarily held out of engagement by a cam face 157 on the arm 144 of the bell crank lever.

As soon as the clutch body starts to move, the pawl 153 clears the cam face 157 and springs into engagement with the teeth of the ratchet wheel 155 long before there is any overrunning load due to the weight of the charger, and as the wheel 155 is fixed to the wheel 138 the pawl 153 locks the clutch body to the ratchet wheels so that overrun is impossible. The cam 157 trips the pawl 153 just before the end of the crank shaft revolution and the pawl is thus held out of engagement with the ratchet wheel 155 so as to avoid clicking in the intervals between crank-shaft operations.

It is necessary to ensure that the charger press button 31 cannot be pushed to start the charger until the latter has a tray in it and the shoes 4 are engaging. This requirement is met by providing a lever 158 with a roller 159 on its end which the neighbouring shoe can engage. The lever is pivoted on a shaft 160 and to this shaft is fixed another lever 161 coupled by a link 162 to a parallel lever 163 drawn to the right, Figure 2B by a spring 164. An extension of the lever 163 is formed as a sector 165 adapted to intercept an abutment 166 on the arm 146. Thus when the parts are in the position shown in Figure 2B, the clutch can be engaged by pressure on the starting button but if the shoe 4 happened to be disengaged from the tray the roller 159 would be pushed to the right and the sector 165 would foul the abutment 166 and prevent the arm 146 from rising.

The arrangement so far described is of a semi-automatic nature as the lever 74 is really intended for manual operation but the apparatus is easily adapted for fully automatic operation in cycles by the employment of two one-revolution clutches as in the construction next to be described and the conversion to automatic working will be considered after the second construction has been described, as the clutching system will be fully dealt with in said description.

In cases where cigarettes are made and immediately packed, a conveyor may be used instead of the truck. A single packing machine can be arranged near two cigarette making machines so that filled trays may be carried across to the packer. Each packer has a conveyor device consisting of two endless conveyors, one being mounted above the other, an elevator of suitable kind being provided at one end to raise trays from the lower conveyor to the other. Full trays are placed on the lower conveyor and move towards the elevator. Trays arriving on the upper conveyor move towards the charger and the empty trays pass to the other end of the conveyor which is just above the tray feeding position of the lower conveyor.

This modification will now be described first with reference to Figures 11 and 12 and thereafter in more detail with reference to the remaining figures.

In the apparatus shown in Figures 11 and 12 the trays T are placed manually on a pair of conveyor bands 170 moving in the direction of the arrow, Figure 11. Guides 171 assist in the proper location of a tray on the conveyor and side guides 172 control the tray as it moves along with the conveyor. The apparatus has a support frame 173 built up of angle-iron and like members. In general these members only act as parts of the frame structure but where a member has some other function it bears a reference number. Thus, for instance, the two vertical members 174 forming the rear end of the frame are provided with lugs 175. One is in the front member and a similar lug, but at a different level, is fixed in the frame member behind the member 174 shown in Figure 11. The purpose of these lugs is to ensure that the attendant always places a tray on the conveyor with a particular face forward. The tray has one detachable side and this is removed when a tray has just been filled in order to enable the attendant to inspect those ends of the cigarettes immediately behind the removable side. The side is then replaced. The tray is so notched, see 300, Figure 12, that it can only be placed on the conveyor with the detachable side leading. As will be clear later the uninspected ends of the cigarettes are visible when a tray has been emptied into the hopper of the packing machine and may then be inspected and defective cigarettes removed.

The conveyor bands 170 are made of steel or other low friction material and when a tray is arrested the bands easily slip beneath it. In this way, trays put on to the conveyor at random are carried along and brought into abutting relationship. The bands are supported on pairs of pulleys 176 and 177, the leading pulleys 177 driving the bands and being themselves driven as described later.

Near the forward ends of the conveyor bands, that is, near the pulleys 177, the trays are arrested by a stop device 178. This stop device coacts with another stop shown at 233 in Figure 11, but better shown in Figures 13, 14, and 15, and the description of these stops is deferred. The result of the actions of these stops is that eventually a tray reaches vertical rails 215 one at each side of the machine.

The leading tray is then raised by a lift or elevator to a higher level on which it can be gripped by the charger arm 245, after a horizontal movement along said level. The lift consists of a pair of vertically movable bars 179, one at each side of the tray, and since these are alike only one bar is described. The bar is a flat metal strip having pairs of guide pins 180, Figures 13, 14 and 15, fixed to it at several places. These pins are grooved and the grooves engage a guide formed by the head of a T-shaped strip 181 fixed vertically to the frame 173. Each bar is reciprocated by a chain 182 which passes over a large driving sprocket wheel 183 and over small guide sprocket wheels 184 and 185 so positioned that the chain line centre is at the midwidth of the reciprocating bar 179.

The large sprocket wheels are fixed to a cross shaft 186 on which is fixed a gear wheel 187. A toothed quadrant 188 pivoted at 189 meshes with the gear wheel and thus as the quadrant is rocked on its pivot the sprocket chains move up and down. The quadrant is oscillated by a connecting rod 190 whose upper end is pivoted to a crank 191 which is rotated as explained later when the driving mechanism is detailed. Each bar 179 has a cradle member 192 fixed to it which moves upwards under the tray and securely engages it for lifting. A steadying plate 193 is associated with each cradle.

A tray elevated in the manner described is brought up to the level marked 194 in Figure 11 and eventually, after said tray has been emptied, it is pushed along the surface 194, being guided by side guides 195, and is finally removed from the apparatus by the attendant.

Figure 16:
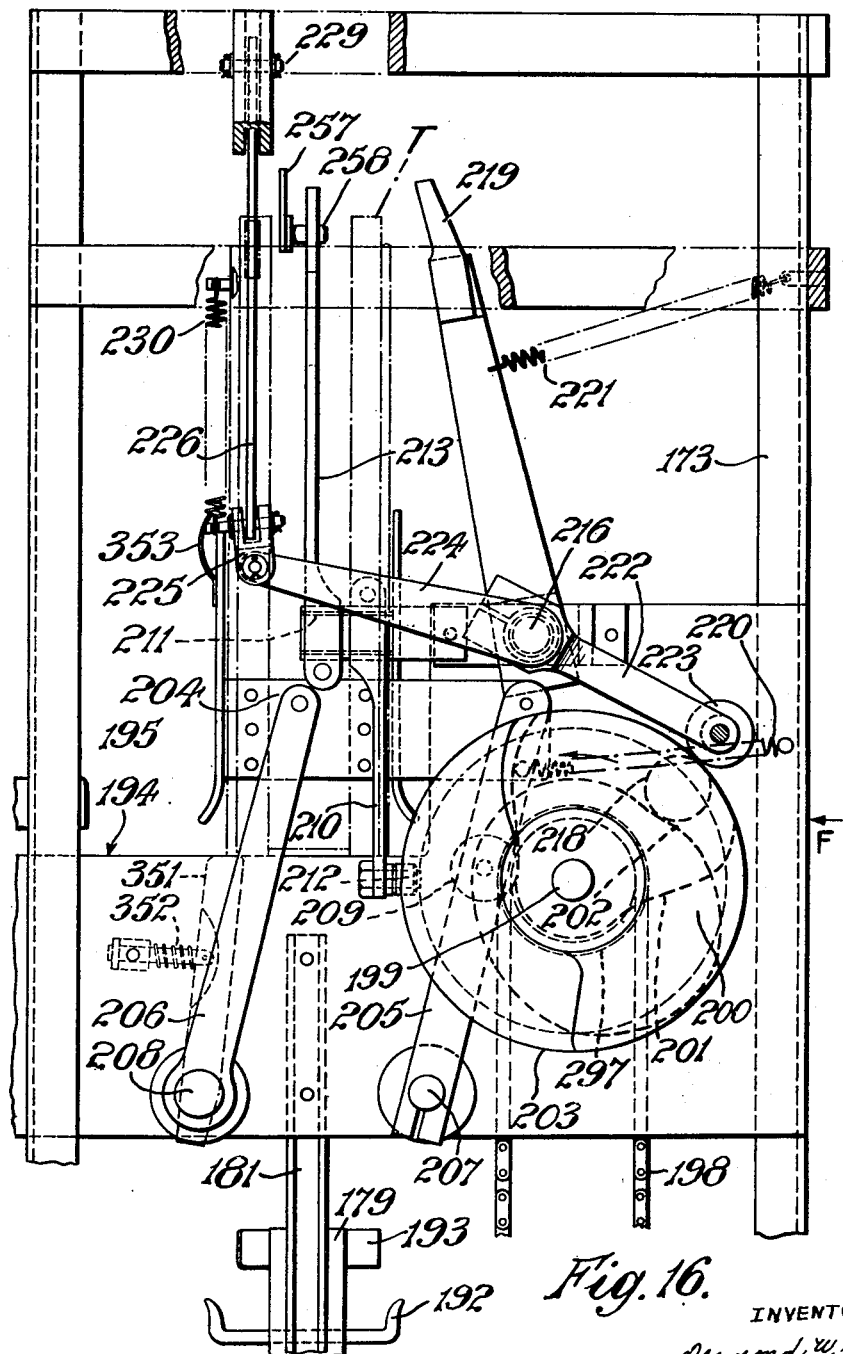
Figure 16 is a view of part of Figure 11 drawn to a larger scale.

A sprocket wheel 196 on the shaft 197 of crank 191 drives an equal sprocket wheel 297 by a chain 198, the wheel 297 being fixed on a cam shaft 199. On this shaft are three disc cams 200, 201 and 202 and a drum cam 203, the functions of the cams being described presently. Near to the cam shaft is a device for receiving a tray brought up by the left and moving it forwards to a position where it can be engaged by the charger arm. This device comprises a channel shaped structure 204, one at each side of the machine, said structure being built up from plates as shown in Figures 16 and 17 and of such size as to embrace the end of a tray. Each structure is supported on a pair of parallel arms 205 and 206, the two arms 205 being fixed to a cross shaft 207, the other two being merely pivoted to the frame 173 at 208.

The nearer arm 205, Figure 16, has a roller 209 on it which engages the cam 201 and this cam, in combination with a spring 220, Figure 16, oscillates the arms 205 and 206 at desired times so that the channel structures 204 at each side of the apparatus swing to and fro and shift the enclosed trays accordingly.

As will be understood more clearly when Figures 19 to 22 are described the charger arm 245 has a pair of tray grippers 265 which are actuated by a pin 258 fixed on a lever 257 pivoted at 255 to the charger, see Figure 19. In order to close the grippers to engage a tray the pin 258 is turned through about 40° in a clockwise direction, Figures 17 and 19, and this movement is effected by a cam lever 210 which is pivoted at 211 and has a roller 212 at one end which runs in the groove of the drum cam 203. A forked lever 213 is fixed to the pivot 211 and forked at its free end and the parts are so arranged and timed that when the charger arm returns to the loading position the pin 258 slides into the fork 214. At a later time in the cycle the cam lever 210 is actuated to cause the grippers to close.

A pivot shaft 216 is provided above the camshaft 199 and at about the middle of this shaft 216 there is fixed a cam lever 217 which has a roller 218 at its free end engaging the cam 202. A forked lever 219 is fixed to the cam lever 217 and the cam 202 in conjunction with a spring 221 causes the forked end of the lever to approach and recede from the charger. The forked part, which is forked merely to clear parts on a tray cover 270, presses against the cover to close it when it is held by a latch all as explained later with reference to Figures 19 and 22. The charger while at rest in the loading position is subject to sundry forces due to the manipulation of parts attached to it and in order to hold the arm 245 steady in said position there provided a locking device whose movements are controlled by the cam 200. For this purpose there is provided a cam lever 222 on the pivot shaft 216 and having a roller 223 at its free end, and an extension 224 of the cam lever is coupled by a simple universal joint 225 to a locking bar 226 having a nose 227 adapted to take over a correspondingly shaped part of a plate 262 fixed on the charger arm 245. The part of the bar near the nose is provided with a cam slot 228, see Figure 17, which slides over a fixed pin 229 and gives the bar the necessary lateral movements. A spring 230 pulls bar 226 upwards.

Referring now to Figures 19 to 22 the charger arm 245 consists of a long casting of angle cross section pivoted at 246. Within the angle of the arm there are housed devices for gripping a tray and latching and unlatching devices for a tray cover member.

The tray grippers comprise levers 247 and 248 pivoted at 249 and 250. To these levers are attached links 251 and 252 and the free ends of the links are pivoted to levers 253 and 254 pivoted at 255 and 256 to the charger arm. The lever 253 is one arm of a bell crank and a second arm 257 has the pin 258 on its free end whereby the bell crank may be rocked about its pivot 255. To the lever 254 there is fixed another lever 259 while the bell crank has a third arm 260 similar to the lever 259 and the two ends of parts 259 and 260 are coupled by a long link 261. It will be noted from Figure 19 that the levers 253, 254 form toggles with their respective links 251, 252 and when the pin 258 has been moved by the fork 214 as explained above, the lower ends of the levers 247, 248 are pressed towards one another with considerable force. To the lever 247 there is fixed by stays 263 and 264, Figure 21, a channel shaped piece 265 which constitutes the gripper itself and a similar piece is fixed to the lever 248. As the toggles act, their middle pivots pass just beyond the dead centre and when the pin 258 is later moved back to the position shown in Figure 19, the toggles are positioned as shown. A spring 267 biases the toggles to hold them as shown, when they are otherwise free of restraint, so that when the fork 214 commences to move, the parts of the toggles are properly disposed with respect to one another. Figures 19 and 21 also show two guide plates 266. These guide a tray when it is moving from the elevator to gripping position and centralise it so that it is properly positioned to be engaged by the gripper channels 265.

As in the construction previously described with reference to Figures 1 to 10 a movable cover is provided for the tray. The tray cover 270, Figure 22, is fixed to two brackets 271 to each of which are pivoted at 272 and 273 respectively a lever 274 and a link 275 also pivoted at 279. The lever 274 is pivoted at 276 to a bracket 277 fixed to the charger arm 245 and a strong spring 278 attached to the free end of the lever 274 tends to swing both lever 274 and link 275 about their pivots. A slotted link 280 pivoted to the lever 274 at 281 runs over a fixed pin 282 and checks the movement of the parts under the action of spring 278 in the following way. A spring washer, not shown, surrounds the pin and the links increase in thickness from the part 282 to the end of the slot. Thus as the slotted link slides over the washer more and more resistance to movement is offered.

The cover 270 is held in the position shown in Figure 22 by a latch 284. This is pivoted at 285 to another bracket 286 fixed to the charger arm and has a nose 289 which is urged over a roller 290 fixed to the cover, by a spring 288. The latch has a tail 287 consisting of two plates which are pressed by the frame of the front guide 295 to release the latch and allow the cover to spring open, that is, move to the right in Figure 22. The cover is provided with a series of bent spring strips. One of these is shown in Figure 22 at 269 and others extend from end to end of the cover. These exert local pressure on cigarettes in the tray and prevent too much free movement when the charger is turned over. The guiding arrangements for cigarettes discharged from a tray into the hopper are rather similar to those employed in the construction described with reference to Figures 1 to 10.

A back guide is provided by a wall 291, Figure 12, forming an extension of the hopper 292 and a fixed side guide 293 is also fitted. A jointed guide 294, Figure 19, is provided at the left hand side, this guide being collapsed by a cam movable with the charger. The arrangement is described in detail in United States application Serial No. 273,185 and needs no further description here.

The front guide is a transparent plate 295, Figures 23 to 26, which is moved up and down by levers 296 pivoted to the plate frame at 298 and being themselves pivoted at 299 to bars 310. A cam 301 rotatable with the charger engages a roller 302 on a lever 303 pivoted at 304 and having another lever 305 attached to it. This second lever has a slot at its free end in which a pin 306 on the tail of the lever 296 works. Thus the lever 296 nearer the cam is swung up and down on its pivot 299. The lever 296 at the right hand of Figure 23 is operated in a similar manner, receiving its motion from the cam by means of a long link 307 coupled to two levers 308, the left-hand one being fixed to the pivot 304 while the right-hand one is pivoted at 309 and has fixed thereto another lever 305 with a slot in its free end. The transparent cover is also movable towards and away from the cigarettes to align them. This movement is obtained by fixing the bars 310 which comprise the pivots 299 for the levers 296 to a shaft 311. A spring 312, Figure 26, tends to pull the cover away from the cigarettes and it is moved in the opposite direction by a cam 313, Figures 20 and 25, which is fixed to the boss of the charger arm and rotates around the charger pivot as the arm swings over. The cam engages a follower 314 formed by an extension to the left-hand bar 310.

The main elements of the drive are shown in Figure 12 and comprise two one-revolution clutches marked in that figure by the references 315 and 316. These clutches are of the same general construction as that described with reference to Figures 2B and 10, but they are arranged in tandem so that when the clutch 315 is started by the press button 317 the second clutch 316 is set into motion by being released by the first.

The clutch 315 drives everything except the band rollers 177, which move continuously, and the charger arm and makes one revolution or cycle whereafter it stops until the button 317 is pressed again. During this cycle the other clutch makes one revolution but at a much greater speed. This clutch 316 drives the charger which executes its complete swing from loading to discharging positions and back again in about a quarter of the time taken by the cycle of the first clutch. In this way the first clutch provides a constant supply of trays for the charger and at the end of a cycle a tray is ready in the charger for the next charger motion. Consequently when the operator notices that the supply of cigarettes in the hopper is low enough, a mere pressure on the button will cause the charger to swing over with a fresh tray full in a very short time and by the end of the cycle the tray feeding devices have placed a tray ready for the charger to embrace.

A shaft 318 which is coupled to the packing machine main shaft forms the driver of a gear box 319. A spiral gear 320 on this shaft drives a shaft 321 having a spiral gear wheel 322 on it. At the external end of the shaft 321 is a sprocket wheel 323 which has a chain 324 on it, the chain passing over a chain wheel 325 forming the driving element of the clutch 316. A shaft 326 transverse to the shaft 321 has a spiral gear wheel 327 on it driven by the spiral gear wheel 322 on the shaft 321. On the exterior end of this shaft 326 is a sprocket wheel 329. This sprocket wheel has a chain 330 passing around it which also passes over a sprocket wheel 331 fixed to a shaft 332 on which the pulleys 177 are mounted. The chain also passes round an idler 333 and then over a large sprocket wheel 334 which is the driving element of the clutch 315. Thus all the parts shown in Figures 11 and 12, except the conveyors 170 which are driven by the chain 330, and the charger arm are driven through the clutch 315. The charger is swung to and fro by a quadrant 335 and gear wheel 338 as in the previous example, the quadrant being oscillated by a connecting rod 336 coupled to a crank 337 which is fixed to the driven shaft of the clutch 316.

Referring now to Figures 27 to 29 it will be seen that the shaft 197 of the clutch 315 has a notched disc 350 on its end and a pawl 341 pivoted at 342 is urged towards this disc by a spring 343. The other end of the pawl has a pin 344 on it which lies beneath an arm 345 pivoted at 346. If the pawl is permitted to move under the influence of the spring into the notch of the disc, the arm (which corresponds to the arm 146, Figure 2B) will rise and permit the clutch members of clutch 316 to engage. At the end of its revolution this clutch will stop automatically and cannot restart until the notch of the disc on shaft 197 has completed a revolution and been started again by pressure on 317.

In order to prevent the apparatus from being started until a tray is in engagement with the rails 215 there are provided at the lower end of the latter pivoted switch operating members 231. These are urged towards a tray by the springs of switches 232, Figure 11, and when a tray is properly in position against the rails 215 it presses the members and closes the switches. The switches complete a circuit which energises a solenoid 347, Figure 28, and the plunger 348 of the latter is lifted to remove its tail 349 from a groove in a rod 350 of which the press button 317 forms the outer end. As soon as the tail is lifted the button can be pressed to start clutch 315.

The remaining details of the apparatus will be described in a short description of its operation. As mentioned previously the trays are arrested by the stop 178 which coacts with stop 233. Referring to Figures 14 and 15, it will be seen that the stop 178 is on a bar 234 pivoted at 235. It is so constructed that the part to the left of the pivot is heavy so, normally, that end drops until it is arrested by a pin 236 which is also an anchor for a spring. As a tray passes over the bar into position against the vertical rails 215 it contacts the uptilted right hand end of bar 234 and raises the stop 178 to obstruct the succeeding tray. Then the elevator begins to lift the first tray and the second stop 233 begins to function. This second stop is pivoted at 237 and its operative end is urged upwards by a spring 238 which is attached to the aforesaid pin. But in the elevator movements the cradle 192, as it moves down, depresses the operative end of the stop 233. As the elevator rises, the stop 178 drops by gravity to its non-operative position and the stop 233 rises to operative position. In consequence, the succeeding tray can move up to the stop 233 where it remains until the elevator comes down again so that said succeeding tray cannot foul the cradle as it comes down. As a safeguard, since lever 234 moves by gravity, a lever 239 pivoted at 240 is provided to ensure that the gravity movement occurs. This lever is raised slightly by an angle 241 mounted on the lifting bar 179 and tilts the bar 234 in the desired direction. The stops 178 and 233 and rails 215 are duplicated, one set at each side of the framework.

A tray carried up by the elevator passes into the two channel shaped members 204 which then move to the left from the position shown in Figure 11 and shift the tray into a position between the grippers 265. As the elevator begins to move down, as soon as it reaches the top of its movement, the tray is temporarily supported at the upper level by a pair of detents 351, one at each side of the apparatus, see Figure 16, which are pressed to the right by springs 352. The tray is then moved over to surface 194. The tray grippers are then closed and then the charger arm swings over and empties the filled tray into the hopper and then returns. Meanwhile the members 204 have moved back again so the empty tray is deposited on the surface at 194 and released as the charger grippers open. In the next cycle the members 204 move a fresh tray into position for gripping and the empty tray is pushed by springs 353 along the surface 194 so that in time a series of empty trays are assembled between the guides 195 and are removed as necessary by the attendant.

The charger locking device 227 is unlocked just before the charger starts to move and locked again at the end of the charger movement so that during the rest period the tray grippers can be opened to release an empty tray and closed again on the new tray brought forward by the members 204.

The forked lever 219 operates to close the tray cover some time before the charger arm starts to move off with a loaded tray and the latch 284 is tripped by its tails 287 striking the frame of the front guide 295.

The operation of apparatus driven by a two-clutch system should now be clear and the diagram, Figure 30, is sufficient to show how such a system may be applied to the construction of Figures 1 to 10. In this diagram the slow moving clutch is marked 353 and rotates once per cycle, after the push button 31, Figure 1, has been pressed. To the clutch body is fixed a grooved cam 354 coupled by a rod 355 to the truck operating lever 74. The starting of the charger clutch 356 is controlled as before by a notched disc 340 and pawl lever 341. To the body of this second clutch is fixed the crank 135 which is coupled to the quadrant 129, Figure 2B, by the connecting rod 133. The drive illustrated is arranged to impart a quick revolution to the clutch 356.

Assuming a loaded tray is in position to be engaged by the shoes 4 and steadying members 5, Figure 1, pressing the starting button 31 will cause the tray to be carried over to the hopper, emptied and returned to the truck whereupon the charger operating clutch stops. The clutch 353 continues to move and the cam racks the truck forwards one pitch and then closes the tray cover, whereupon the clutch stops. The apparatus is then ready to empty a new tray as soon as the button 31 is pressed.

While in the construction shown in Figure 11 there is only one endless conveyor, it is clear that a similar conveyor aligned with the surface 194 may be provided to facilitate the movement of empty trays.

What we claim as our invention and desire to secure by Letters Patent is:

1. The combination with a device for loading the hopper of a cigarette packing machine with the contents of cigarette trays including charging means for gripping said tray, inverting it over said hopper and returning the empty tray, of means for feeding trays to said device comprising means for providing a supply of trays for said charging means, positively acting means independent from said first-named means for moving said trays one at a time from said supply to a position where they may be gripped by said charging means, a slow moving single revolution clutch for operating said positively acting means, a quick acting single revolution clutch operatively coupled to said slow moving clutch and actuated thereby for operating said charging means, and means for actuating said slow moving clutch.

2. Apparatus as claimed in claim 1 for discharging the contents of cigarette containers or trays into the hopper of a cigarette packing machine, including a shop truck adapted to support a number of trays thereon in spaced relationship, means for coupling the truck to said apparatus and moving it by stages equal to the spacing of the trays to permit said charging means to remove a tray from the truck and invert it over the machine hopper and return the empty tray to the truck and means for thereafter moving the truck a stage to bring a fresh tray into position where it can be engaged by the charger.

3. Apparatus as claimed in claim 2 including means for preventing the movement of clutch actuating means until a tray is gripped by the charger.

4. In combination with a charger for discharging the contents of cigarette trays into the hopper of a cigarette packing machine a support on which said trays are arranged, means for moving said trays along the support and towards a position where said charger is adapted to move a tray from said position and invert it over the machine hopper and return the empty tray to said position, means for thereafter moving the trays to bring a fresh tray into position where it can be engaged by said charger, a further support over which empty trays are moved from said position, the supports being positioned one above the other, and means for actuating said tray-moving means and said charger.

5. The apparatus as claimed in claim 4 wherein at least one of said supports is an endless conveyor.

6. The apparatus as claimed in claim 4 including an elevator for moving said trays from said supports to said position.

7. Apparatus as claimed in claim 4 including means for preventing the movement of clutch actuating means unless a tray is in position to be engaged by the elevator to replace the tray occupying the said position where it can be engaged by the charger.

References Cited in the file of this patent

UNITED STATES PATENTS

| Number | Name | Date |
|---|---|---|
| 1,295,195 | Parker | Feb. 25, 1919 |
| 2,344,664 | Adams | Mar. 21, 1944 |
| 2,365,007 | Rideout et al. | Dec. 12, 1944 |
| 2,577,091 | Porter | Dec. 4, 1951 |